United States Patent
Takayanagi et al.

(10) Patent No.: US 9,262,968 B2
(45) Date of Patent: Feb. 16, 2016

(54) IMAGE DISPLAY APPARATUS AND CONTROL METHOD THEREOF

(71) Applicant: CANON KABUSHIKI KAISHA, Tokyo (JP)

(72) Inventors: Daisuke Takayanagi, Kawasaki (JP); Teruki Kikkawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/047,400

(22) Filed: Oct. 7, 2013

(65) Prior Publication Data

US 2014/0098079 A1 Apr. 10, 2014

(30) Foreign Application Priority Data

Oct. 10, 2012 (JP) ................................. 2012-225316
Jul. 23, 2013 (JP) ................................. 2013-152555

(51) Int. Cl.
*G09G 3/34* (2006.01)
*G06F 3/14* (2006.01)

(52) U.S. Cl.
CPC ............ *G09G 3/3406* (2013.01); *G06F 3/1423* (2013.01); *G09G 3/3426* (2013.01); *G09G 2320/0233* (2013.01); *G09G 2320/041* (2013.01); *G09G 2320/064* (2013.01); *G09G 2360/145* (2013.01)

(58) Field of Classification Search
CPC ..................... G09G 3/3406; G09G 2360/141
USPC ...................................................... 345/87, 102
See application file for complete search history.

(56) References Cited

U.S. PATENT DOCUMENTS

| | | | |
|---|---|---|---|
| 7,161,577 B2* | 1/2007 | Hirakata et al. | 345/102 |
| 2009/0085862 A1* | 4/2009 | Takaku et al. | 345/102 |
| 2009/0122087 A1* | 5/2009 | Maruyama et al. | 345/690 |
| 2009/0303172 A1* | 12/2009 | Park et al. | 345/102 |
| 2010/0006746 A1* | 1/2010 | Hirose | 250/208.2 |
| 2013/0134396 A1* | 5/2013 | Shimomura et al. | 257/40 |
| 2013/0265336 A1* | 10/2013 | Kikkawa | 345/690 |
| 2014/0092001 A1* | 4/2014 | Kikkawa | 345/102 |

FOREIGN PATENT DOCUMENTS

JP 2006-040764 A 2/2006

* cited by examiner

*Primary Examiner* — Ricardo L Osorio
(74) *Attorney, Agent, or Firm* — Carter, DeLuca, Farrell & Schmidt, LLP

(57) ABSTRACT

An image display apparatus according to the present invention includes: a light emitting unit configured to include a light source; a display unit configured to display an image on a screen by transmitting light irradiated from the light emitting unit; a detection unit configured to detect light from the light source; and a control unit configured to extend a lighting duration of the light source when the detection unit detects light in a case where the lighting duration of the light source is shorter than a predetermined time length.

21 Claims, 31 Drawing Sheets

FIG. 4

| | CURRENT VALUE (0~1000) | LIGHTING DURATION (0~1000) | UNEVENNESS MEASUREMENT RESULT | INITIAL LIGHTING DURATION (0~1000) |
|---|---|---|---|---|
| LIGHT SOURCE UNIT 0 | 500 | 500 | 95% | 526 |
| LIGHT SOURCE UNIT 1 | 500 | 500 | 100% | 500 |
| LIGHT SOURCE UNIT 2 | 500 | 500 | 103% | 485 |
| LIGHT SOURCE UNIT 3 | 500 | 500 | 102% | 490 |
| LIGHT SOURCE UNIT 4 | 500 | 500 | 105% | 476 |
| LIGHT SOURCE UNIT 5 | 500 | 500 | 98% | 510 |

FIG. 7

| | TARGET OPTICAL SENSOR VALUE (0~1000) |
|---|---|
| LIGHT SOURCE UNIT 0 | 500 |
| LIGHT SOURCE UNIT 1 | 496 |
| LIGHT SOURCE UNIT 2 | 502 |
| LIGHT SOURCE UNIT 3 | 505 |
| LIGHT SOURCE UNIT 4 | 499 |
| LIGHT SOURCE UNIT 5 | 498 |

FIG. 16

| CURRENT VALUE AFTER REDUCTION | CURRENT CORRECTION VALUE |
|---|---|
| 1000 | 1.50 |
| 990 | 1.48 |
| 980 | 1.47 |
| ... | ... |
| 500 | 1.00 |
| ... | ... |
| 300 | 0.93 |
| 290 | 0.92 |
| ... | ... |
| 250 | 0.83 |
| ... | ... |

FIG. 20

| PRESET LIGHTING DURATION | LIGHTING DURATION EXTENTION SCALE FACTOR |
|---|---|
| 0 | 1 |
| 1~5 | 100 |
| 6~25 | 20 |
| 26~83 | 5 |

FIG. 21

| PRESET LIGHTING DURATION | CURRENT VALUE REDUCTION SCALE FACTOR |
|---|---|
| 0 | 1 |
| 1~5 | 1/100 |
| 6~25 | 1/20 |
| 26~83 | 1/5 |

FIG. 26

| | TARGET OPTICAL SENSOR VALUE (0~1000) | STANDARD TEMPERATURE SENSOR VALUE (°C) |
|---|---|---|
| LIGHT SOURCE UNIT 0 | 500 | 60 |
| LIGHT SOURCE UNIT 1 | 496 | 59.5 |
| LIGHT SOURCE UNIT 2 | 502 | 60.5 |
| LIGHT SOURCE UNIT 3 | 505 | 61 |
| LIGHT SOURCE UNIT 4 | 499 | 60 |
| LIGHT SOURCE UNIT 5 | 498 | 60 |

FIG. 28

| TEMPERATURE | LIGHTING DURATION EXTENTION SCALE FACTOR | CURRENT VALUE REDUCTION SCALE FACTOR |
|---|---|---|
| 41~44 | 20 | 1/20 |
| 44~48 | 5 | 1/5 |
| 48~52 | 2 | 1/2 |
| 52~56 | 1.5 | 1/1.5 |
| 56~60 | 1 | 1 |

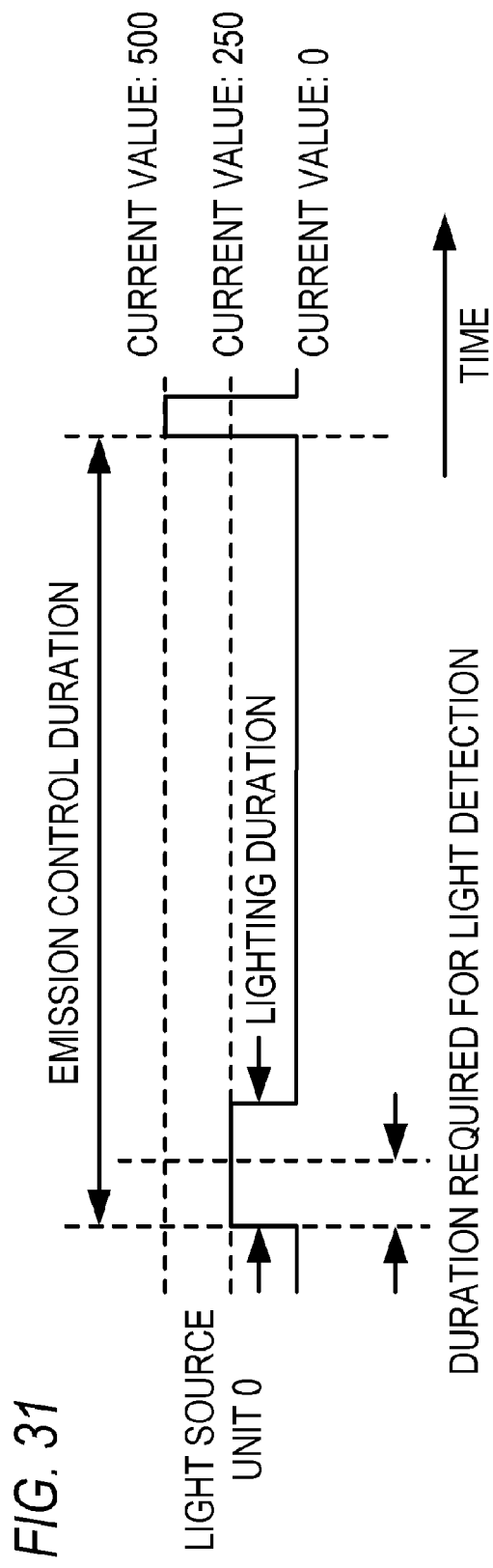

IMAGE DISPLAY APPARATUS AND CONTROL METHOD THEREOF

BACKGROUND OF THE INVENTION

1. Field of the Invention

The present invention relates to an image display apparatus and a control method thereof.

2. Description of the Related Art

Recently liquid crystal display apparatuses, having a light emitting diode (LED) backlight as a light source, are becoming popular. Particularly the use of liquid crystal display apparatuses having a direct backlight where a plurality of LEDs are arrayed are rapidly spreading. In the case of a direct backlight, local dimming control for partially adjusting the amount of luminescence can be performed relatively easy. By performing local dimming, the contrast ratio (ratio of the maximum brightness and the minimum brightness) can be improved, and power consumption can be decreased.

Available methods of adjusting the amount of luminescence of a backlight are a method of adjusting a value of current to be supplied to LEDs, and a method of adjusting the lighting duration of LEDs. In the case of the method of adjusting the current value to be supplied to LEDs, emission brightness (instantaneous value) of the LEDs can be decreased and the amount of luminescence of the LEDs can be decreased by decreasing the current value. In other words, the brightness of the backlight can be decreased by decreasing the current value. And the emission brightness of the LEDs can be increased and the amount of luminescence of the LEDs can be increased by increasing the current value. The brightness of the backlight can be increased by increasing the current value. In the case of adjusting the lighting duration of LEDs, the amount of luminescence of the LEDs can be increased by extending the lighting duration, and can be decreased by shortening the lighting duration.

Generally the method of adjusting the lighting duration is used because power efficiency is high. Adjustment of the lighting duration is referred to as pulse width modulation (PWM) control. In PWM control, the ratio (duty ratio) in a predetermined duration (emission control duration) is changed.

LEDs have characteristics where individual difference, time related deterioration and temperature deterioration are considerable. Hence in the case of the above mentioned direct backlight, it has been difficult to keep the amount of luminescence of the backlight (e.g. amount of luminescence in the emission control duration) constant and uniform over a long duration (a long period). Therefore as a method for keeping the amount of luminescence constant and uniform, a method of detecting the emission brightness of each light source unit using an optical sensor installed near the backlight and controlling the amount of luminescence by feedback has been proposed (e.g. see Japanese Patent Application Laid-Open No. 2006-40764). In the feedback control, the current value to be supplied to each light source unit is corrected so that the detected value becomes close to the target value, for example. A light source unit is a minimum unit of the backlight of which the amount of luminescence can be controlled, for example. In other words, the backlight has a configuration that allows the amount of luminescence to be controlled for each light source unit.

However noise normally enters the detection result of emission brightness (e.g. voltage value corresponding to the emission brightness). This makes it necessary to increase the accuracy of the detection result by acquiring the detection value of the emission brightness a plurality of times, or blocking high frequency noise using an LPF (Low Pass Filter) installed on a sensor circuit. Performing such processing increases the time length required for the optical sensor to detect the emission brightness. Therefore if the single lighting duration is short (e.g. lighting duration is set to be short to decrease the amount of luminescence of the backlight when the display mode of the image display apparatus is in low brightness mode, in which brightness on the screen is darkened). If detection of the emission brightness cannot be completed within the lighting duration, the detection result may not be acquired, or an erred detection result may be acquired, which makes it impossible to control the amount of luminescence of the backlight (light emitting unit) at high precision.

SUMMARY OF THE INVENTION

The present invention provides a technique to detect light from the light emitting unit at high precision, and control the amount of luminescence of the light emitting unit at high precision.

The present invention in its first aspect provides an image display apparatus comprising:

a light emitting unit configured to include a light source;

a display unit configured to display an image on a screen by transmitting light irradiated from the light emitting unit;

a detection unit configured to detect light from the light source; and a control unit configured to extend a lighting duration of the light source when the detection unit detects light in a case where the lighting duration of the light source is shorter than a predetermined time length.

The present invention in its second aspect provides an image display apparatus comprising:

a light emitting unit configured to include a light source;

a display unit configured to display an image on a screen by transmitting light irradiated from the light emitting unit;

a first detection unit configured to detect light from the light source; and a control unit configured to extend a lighting duration of the light source when the first detection unit detects light in a case where the emission brightness of the light source is lower than a first predetermined brightness.

The present invention in its third aspect provides a control method of an image display apparatus including a light emitting unit configured to include a light source and a display unit configured to display an image on a screen by transmitting light irradiated from the light emitting unit, the control method comprising:

detecting light from the light source; and extending a lighting duration of the light source when light is detected in a case where the lighting duration of the light source is shorter than a predetermined time length.

According to the present invention, light from the light emitting unit can be detected at high precision, and the amount of luminescence of the light emitting unit can be controlled at high precision.

Further features of the present invention will become apparent from the following de script ion of exemplary embodiments with reference to the attached drawings.

BRIEF DESCRIPTION OF THE DRAWINGS

FIG. 4 shows an example of the unevenness measurement conditions, unevenness measurement results and initial lighting duration according to Embodiment 1;

FIG. 7 shows an example of target optical sensor values according to Embodiment 1;

FIG. 16 is an example of a table showing a relationship between a current value and a correction value according to Embodiment 2;

FIG. 20 is an example of a table showing lighting duration after extension according to Embodiment 3;

FIG. 21 is an example of a table showing current values after reduction according to Embodiment 3;

FIG. 26 shows an example of target optical sensor values according to Embodiment 4;

FIG. 28 is an example of a table showing a lighting duration extension scale factor and a current value reduction scale factor according to Embodiment 4;

FIG. 31 shows an example of lighting control of the light source unit during the optical sensor value detection according to Embodiment 4.

DESCRIPTION OF THE EMBODIMENTS

Embodiment 1

A light source apparatus and a control method thereof according to Embodiment 1 of the present invention will now be described.

According to this embodiment, when the state of the light source apparatus is a low brightness (luminance) state (a single lighting duration of a light source of the light source apparatus is shorter than a sensor detection time length), the single lighting duration of the light source is extended, and the current value to be supplied to the light source is reduced. The sensor detection time length is the time length required for an optical sensor to detect light from the light source. Then the amount of luminescence (amount of emission) of the light source is controlled based on the detection result (detection result by the optical sensor) in the state where the lighting duration is extended and the current value is reduced. Thereby a highly accurate detection result can be acquired even if the state of the light source apparatus is a low brightness state, and the amount of luminescence of the light source can be highly accurately controlled. The light source apparatus controls the lighting and the light out of the light source for each predetermined duration (emission control duration). The amount of luminescence is an amount of luminescence in a single lighting duration or an amount of luminescence in an emission control duration, for example.

In this embodiment, it is assumed that the amount of luminescence is constant if a value generated by multiplying the lighting duration by the current value is constant.

A configuration of the light source apparatus according to this embodiment will be described first with reference to FIG. 1 and FIG. 2. The light source apparatus according to this embodiment can be used as a backlight of an image display apparatus, such as a liquid crystal display apparatus, and a lighting apparatus such as a street light and an interior light. In this embodiment, a case when the light source apparatus is a backlight of an image display apparatus will be described. In the image display apparatus according to this embodiment, a display panel transmits light irradiated from the backlight, whereby an image is displayed on the screen. The image display apparatus is not limited to the transmission type liquid crystal display apparatus. The image display apparatus can be any display apparatus that has an independent light source. For example, the image display apparatus may be a reflection type liquid crystal display apparatus. The image display apparatus may be a micro electro mechanical system (MEMS) shutter type display, which uses an MEMS shutter instead of liquid crystal elements.

Figure 1:
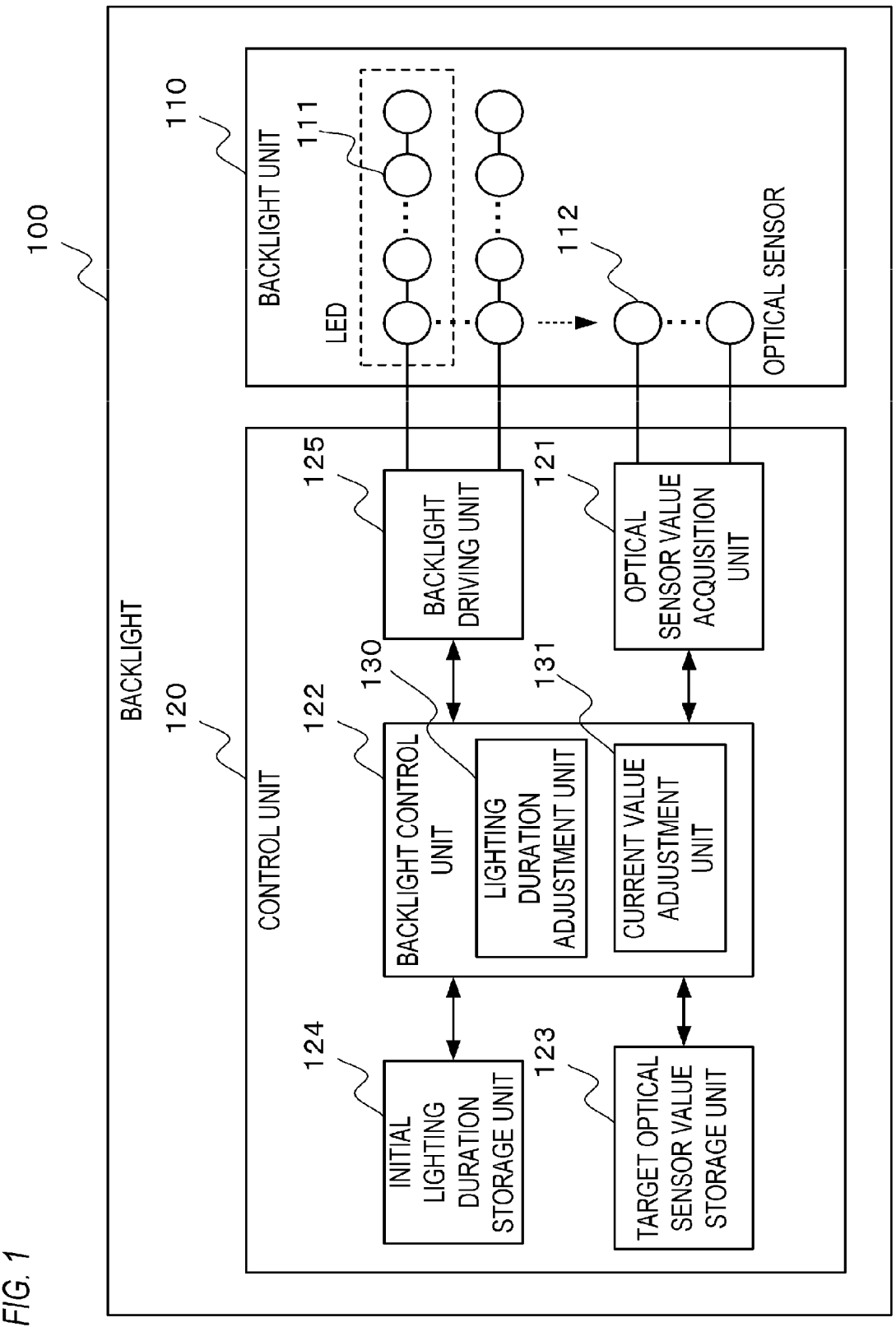
FIG. 1 is a block diagram depicting an example of a configuration of a light source apparatus according to Embodiment 1.

FIG. 1 is a block diagram depicting an example of a configuration of the light source apparatus according to this embodiment.

The light source apparatus 100 (hereafter called "backlight") depicted in FIG. 1 has a backlight unit 110 and a control unit 120.

The backlight unit 110 includes a plurality of light source units (enclosed by the broken line in FIG. 1) and a plurality of optical sensors 112. The light source unit is a minimum unit of the backlight 100 (backlight unit 110) to control the amount of luminescence, for example. In other words, the backlight 100 has a configuration that can control the amount of luminescence for each light source unit. One light source unit includes a plurality of LEDs 111 connected in a series as a light source.

The control unit 120 includes an optical sensor value acquisition unit 121, a backlight control unit 122, a target optical sensor value storage unit 123, an initial lighting duration storage unit 124, and a backlight driving unit 125. The backlight control unit 122 includes a lighting duration adjustment unit 130 and a current value adjustment unit 131.

Figure 2:
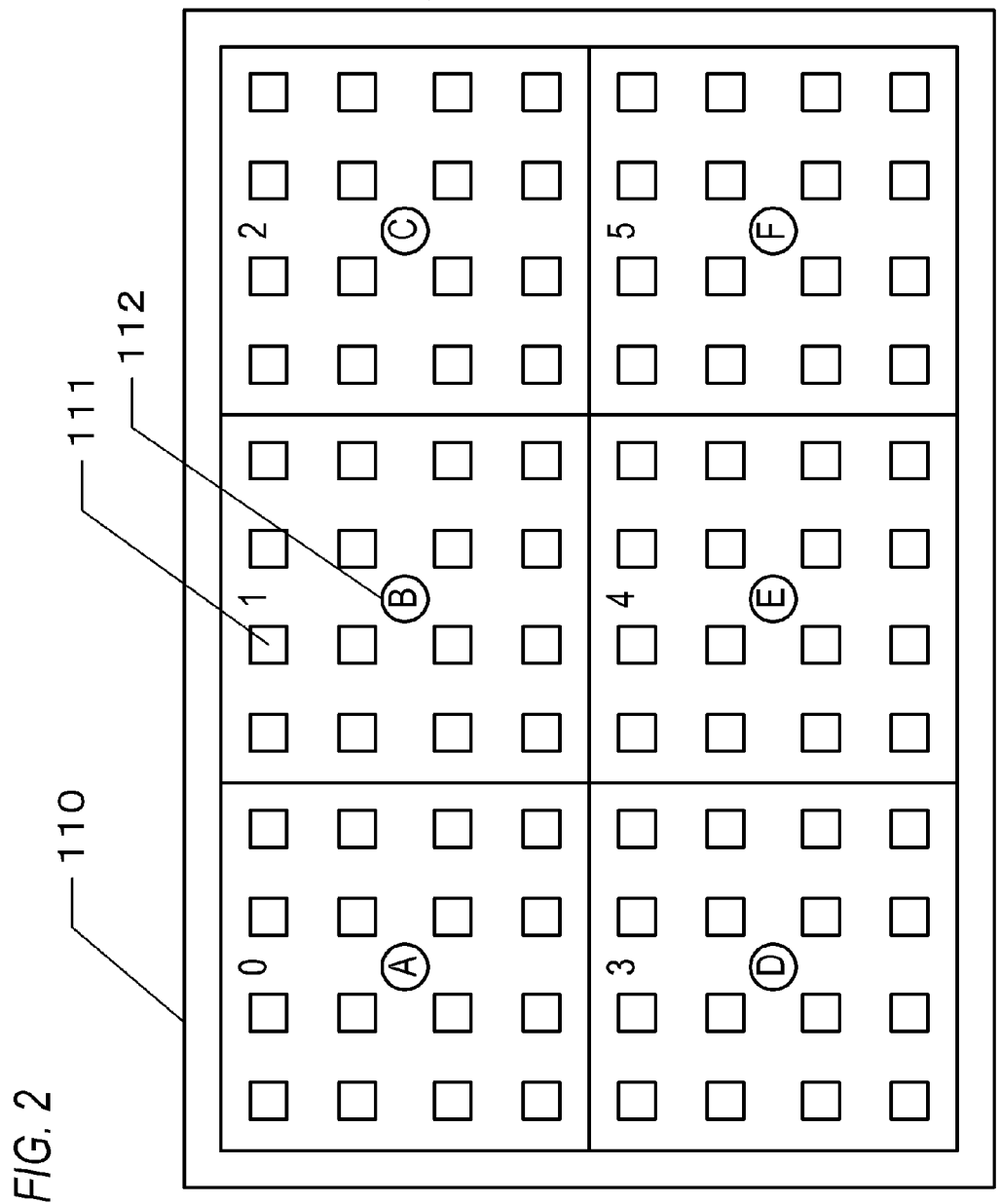
FIG. 2 is a schematic diagram depicting an example of a configuration of a backlight unit according to Embodiment 1.

FIG. 2 is a schematic diagram depicting an example of an arrangement of LEDs 111 and optical sensors 112 of the backlight unit 110 according to this embodiment. In the example in FIG. 2, the backlight unit 110 is separated into six light source units 0 to 5 arranged in two rows by three columns. In one light source unit, 16 LEDs are arrayed as a light source. Each of the 16 LEDs of one light source unit lights (emits light) with a same current value and lighting duration. The optical sensors A to F are installed in the light source units 0 to 5 respectively.

A number of light source units may be more or less than six. A number of light source units may also be one. A plurality of optical sensors may be installed in one light source unit, or a plurality of optical sensors may be installed in a plurality of light source units.

An overview of processing to maintain the amount of luminescence of the backlight 100 to be constant and uniform will now be described.

In the target optical sensor value storage unit 123, a target optical sensor value (target optical sensor value for each light source unit) which is set in the adjustment step during production has been recorded in advance. The target optical sensor value is a target value of the light detected by the optical sensor (light from the light source unit).

In the initial lighting duration storage unit 124, the lighting duration which is set in the adjustment step during production (single lighting duration after unevenness correction in each light source unit) has been recorded.

In the initial state, the backlight 100 repeats lighting and light out according to the lighting duration stored in the initial lighting duration storage unit 124. At this time, a predetermined value of current is supplied to each light source unit.

When the backlight 100 is lit, the backlight control unit 122 periodically performs the amount of luminescence control processing. The amount of luminescence control processing is a control processing to control (correct) the amount of luminescence of the light source unit based on the detection result by the optical sensor (optical sensor value). The optical sensor value is, for example, an emission brightness (instantaneous value) or quantity of light (accumulated value).

In concrete terms, in the amount of luminescence control processing, the optical sensor value acquisition unit 121 acquires an optical sensor value from the optical sensor for each light source unit responding to an instruction from the backlight control unit 122. For each light source unit, the backlight control unit 122 compares the optical sensor value acquired by the optical sensor value acquisition unit 121 and the target optical sensor value stored in the target optical sensor value storage unit 123. According to the result of this comparison, the backlight control unit 122 determines (adjusts), for each light source unit, the value of the current to be supplied to the light source unit and the lighting duration of the light source unit. Then the backlight control unit 122 outputs the current value (current value after adjustment) and the lighting duration (lighting duration after adjustment) of each light source unit to the backlight driving unit 125.

The backlight driving unit 125 drives (lights) each light source unit according to the current value and the lighting duration outputted from the backlight control unit 122.

A single lighting duration of each light source unit can be changed. For example, the user can adjust the brightness of the backlight (lighting duration of each light source unit). If the single lighting duration of the light source unit is shorter than a predetermined time length, the amount of luminescence of the light source unit cannot be accurately controlled. In concrete terms, an optical sensor value cannot be acquired or an incorrect optical sensor value is acquired in the amount of luminescence control processing, therefore the amount of luminescence of the light source unit cannot be accurately controlled. In such a case, according to this embodiment, the lighting duration and the current value are adjusted using the lighting duration adjustment unit 130 and the current value adjustment unit 131, whereby an accurate optical sensor value can be acquired, and the amount of luminescence of the light source unit can be accurately controlled as a result.

In this embodiment, it is assumed that the predetermined time length is the time length required for the optical sensor to detect light (time length required for acquiring the optical sensor value in the amount of luminescence control processing).

The brightness of the backlight may be automatically changed based on the ambient environment, image data or the like.

Figure 3:
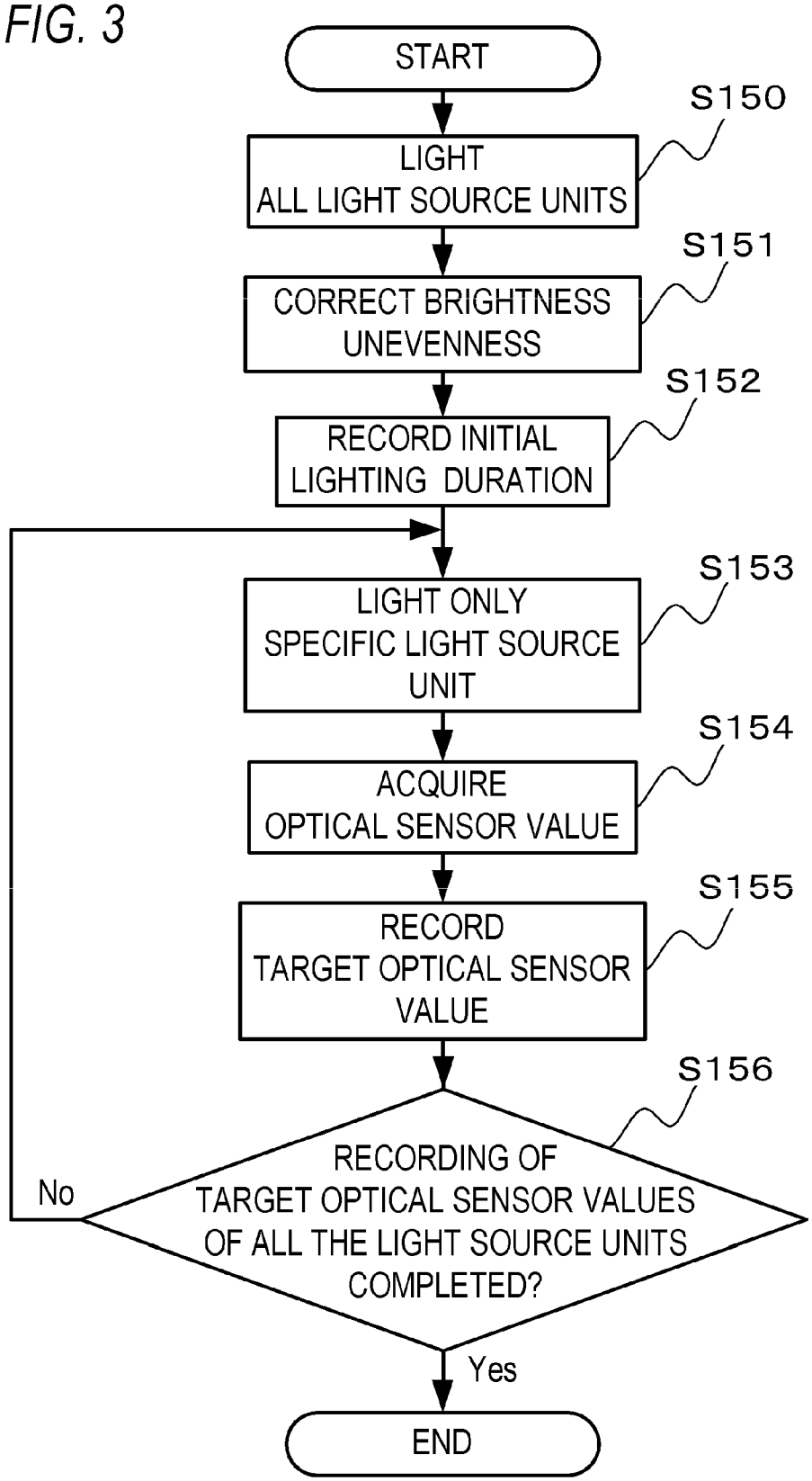
FIG. 3 is a flow chart depicting an example of a method of recording a target optical sensor value and initial lighting duration according to Embodiment 1.

Now a method of recording the target optical sensor value and the initial lighting duration will be described with reference to FIG. 3. FIG. 3 is a flowchart depicting an example of the method of recording the target optical sensor value and the initial lighting duration. The processing flow in FIG. 3 is performed in the adjustment step during production, for example.

First in S150, the backlight control unit 122 instructs the backlight driving unit 125 to light all the LEDs 111 with a predetermined current value and lighting duration. Responding to the instruction from the backlight control unit 122, the backlight driving unit 125 lights all the LEDs 111 with the predetermined current value and lighting duration. FIG. 4 shows an example of the current value and lighting duration for each light source unit in this case. In the example in FIG. 4, 500 is set as a current value for each light source unit. And 500 is set as a lighting duration for each light source unit.

The current value (current control value) is an integer in the 0 to 1000 range, and the current value (value of current actually supplied) linearly increases as the current control value increases. For example, if the current control value is 1000, the current that is double the case of the current control value 500 is supplied to the light source unit. If the current control value is 0, current is not supplied to the light source unit, and the light source unit is in light out state.

The lighting duration (lighting duration control value) is an integer in the 0 to 1000 range, and the lighting duration (actual duration) linearly increases as the lighting duration control value increases. For example, if the lighting duration control value is 1000, the actual lighting duration is double the case of the lighting duration control value 500. If the lighting duration control value is 0, the actual lighting duration is 0, and the light source unit is in the light out state.

The ranges of the current value (current control value) and the lighting duration (lighting duration control value) are not limited to the above values (0 to 1000). The actual current value may non-linearly increase as the current control value increases, or may decrease as the current control value increases. This is the same for the lighting duration control value.

Then in S151, the brightness unevenness of the display area (brightness unevenness on the screen of the image display apparatus) is measured by an external measuring instrument, which is not illustrated. Then based on the measurement result of the brightness unevenness, the backlight control unit 122 corrects the lighting duration of each light source unit so that the brightness of the display area becomes constant and uniform. For example, if the unevenness measurement result of the light source unit 0 (ratio of the brightness on the screen with respect to the expected brightness) is 95%, then the lighting duration is extended to increase the amount of luminescence of the light source unit 0. In concrete terms, the lighting duration before adjustment is 500, so the lighting duration is adjusted to 526 (=500×100/95). Thereby the shortage (5%) of brightness is compensated. FIG. 4 shows an example of the unevenness measurement result for each light source unit and lighting duration after adjustment (initial lighting duration).

Then in S152, the backlight control unit 122 records the initial lighting duration for each light source unit in the initial lighting duration storage unit 124.

In S151, both the lighting duration and the current value may be adjusted, and the lighting duration of the current value after adjustment may be recorded. In this case, in the initial state, the backlight 100 is lit according to the lighting duration and the current value after adjustment. Only the current value may be adjusted and the current value after adjustment may be recorded. In this case, in the initial state, the backlight 100 is lit according to the current value after adjustment and the predetermined lighting duration.

Figure 5:
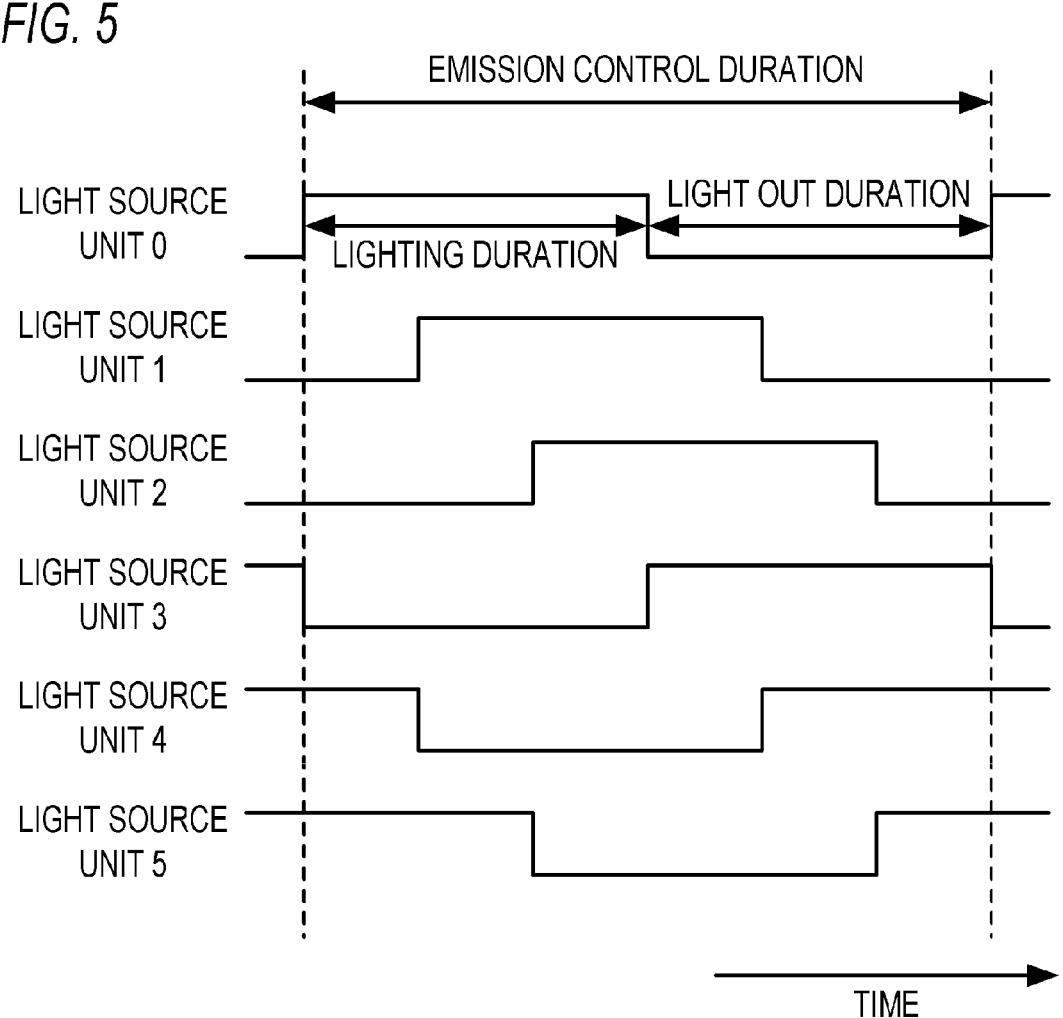
FIG. 5 shows an example of the lighting control of a light source unit during normal operation according to Embodiment 1.
Figure 6:
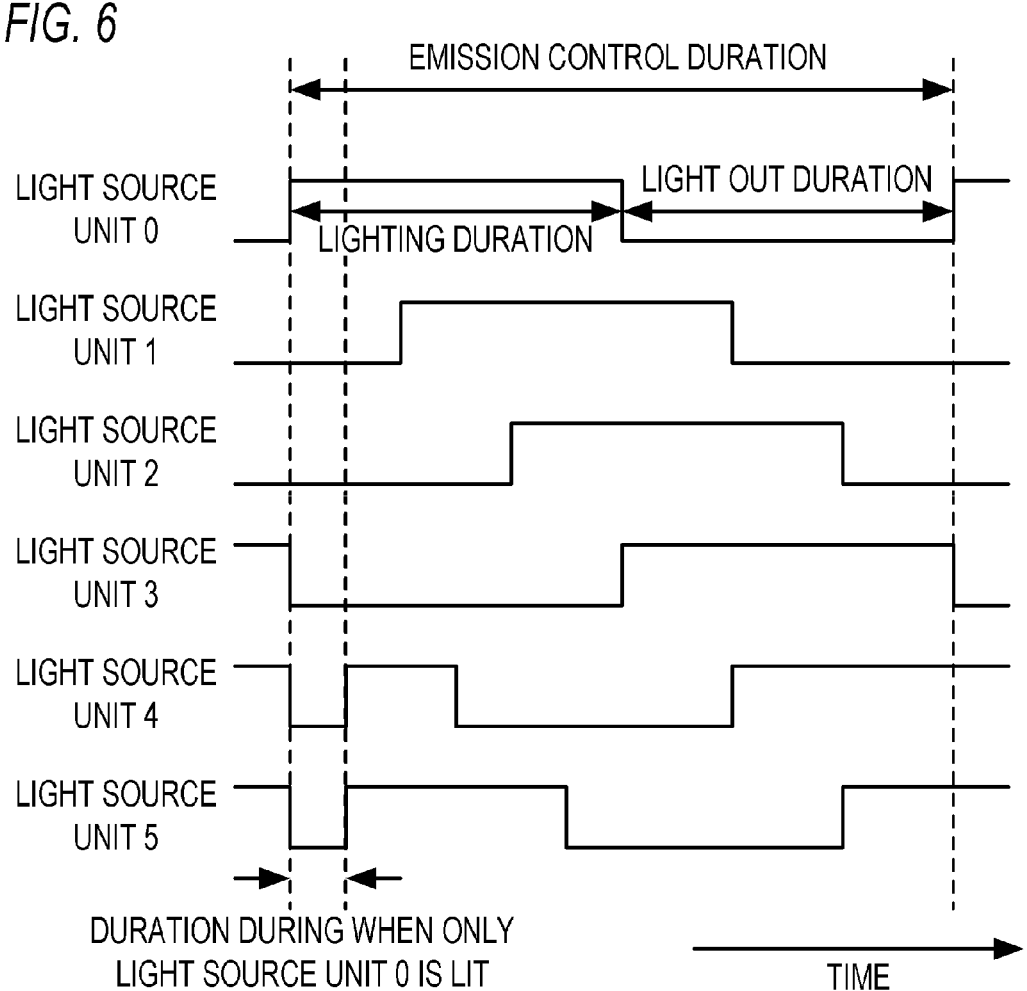
FIG. 6 shows an example of lighting control of the light source unit during optical sensor value detection according to Embodiment 1.

Then in S153, the backlight control unit 122 instructs the backlight driving unit 125 to generate a duration during when only a specific light source unit is lit. For example, it is assumed that each light source unit turns ON/OFF in the emission control duration, as shown in FIG. 5. If the backlight control unit 122 instructs to generate a duration during when only the light source unit 0 is lit, the backlight driving unit 125 adjusts the lighting duration of the backlight temporarily, as shown in FIG. 6, so as to generate a duration during when only the light source unit 0 is lit. In this case, the backlight driving unit 125 notifies the backlight control unit 122 that the duration during when only the specific light source unit is lit is generated.

After the backlight driving unit 125 notifies the backlight control unit 122 that the duration during when only the specific light source unit is lit is generated, processing advances to S154. In S154, the backlight control unit 122 instructs the optical sensor value acquisition unit 121 to acquire an optical sensor value of the specific light source unit. The optical sensor value acquisition unit 121 acquires an optical sensor value from an optical sensor installed in the specific light source unit. The optical sensor value is acquired for a plurality of times to remove noise. And a representative value (e.g. mean value, mode value, median value) of the acquired plurality of optical sensor values is acquired as a final optical sensor value. A time lag is generated until light from the specific unit is detected in a state where only this specific unit is lit. Therefore in order to determine a final optical sensor value, the state where only the specific light source unit is lit must be maintained to a degree.

It is also acceptable that the processing to acquire the optical sensor value from the optical sensor is performed only once, processing to remove noise (filtering) is performed on the acquired optical sensor value, and the filtered optical sensor value is acquired as the final optical sensor value. The final optical sensor value may be acquired by filtering the representative value (representative value of a plurality of optical sensor values).

Then in S155, the backlight control unit 122 records the optical sensor value acquired in S154 in the target optical sensor value storage unit 123 as the target optical sensor value.

Then in S156, the backlight control unit 122 determines whether the target optical sensor values of all the light source units are recorded. If the target optical sensor values of all the light source units are recorded, this processing flow ends. If there is a light source unit of which target optical sensor value is not recorded, the backlight control unit 122 sets the light source unit of which target optical sensor value is not recorded as the specific light source unit mentioned above. Then processing returns to S153.

FIG. 7 shows an example of a target optical sensor value of each light source unit that is determined like this.

Figure 8:
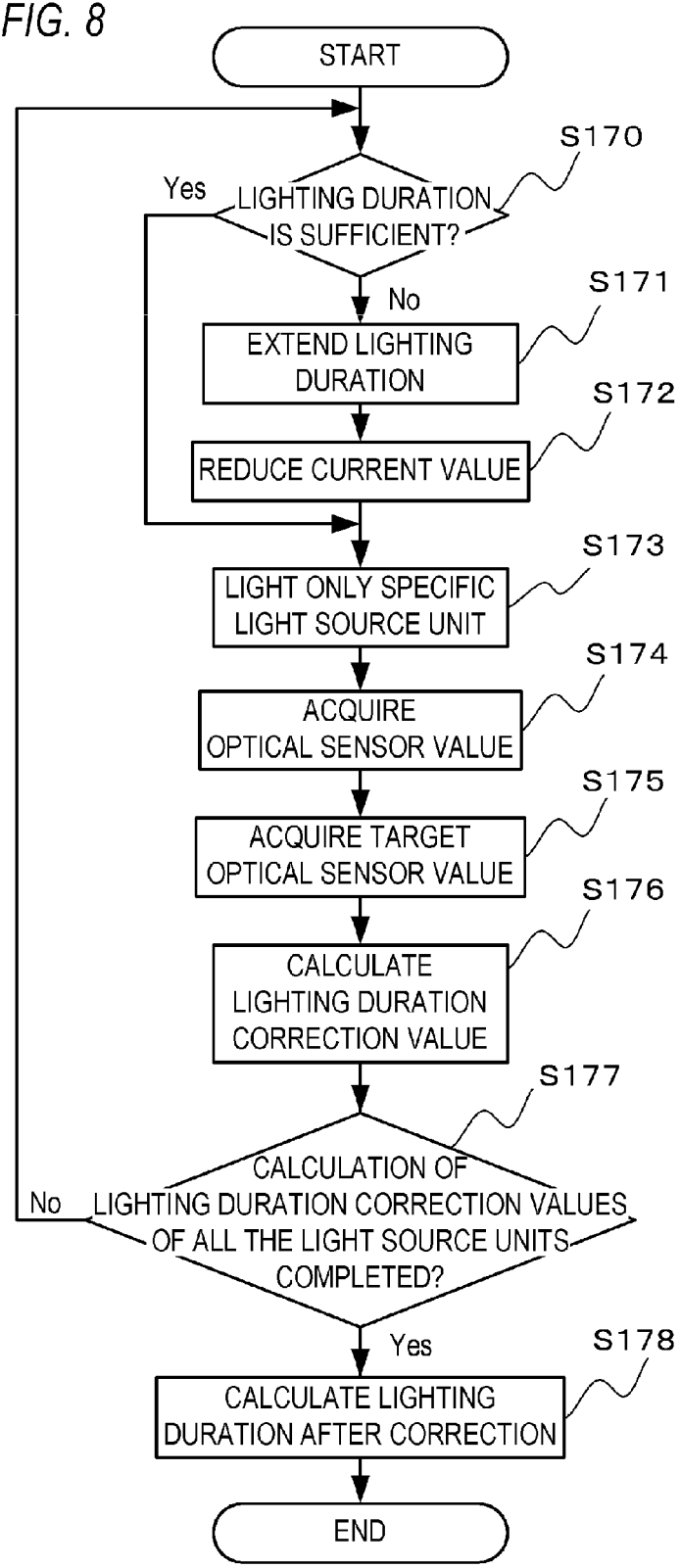
FIG. 8 is a flow chart depicting an example of the amount of luminescence control processing according to Embodiment 1.

Now a method of controlling the amount of luminescence of the backlight 100 (amount of luminescence control processing) according to this embodiment will be described with reference to FIG. 8. FIG. 8 is a flow chart depicting an example of a method of controlling the amount of luminescence of the backlight 100, in concrete terms, a method of maintaining the amount of luminescence (brightness) of the entire backlight 100. The processing flow in FIG. 8 is performed when the user uses the image display apparatus, for example, at predetermined intervals. The predetermined interval is a time length when the amount of luminescence does not radically change due to temperature changes, such as 10 seconds.

The timing of performing the processing flow in FIG. 8 is not limited to the above timing. For example, performing the processing flow in FIG. 8 may be triggered by receiving an instruction to correct the amount of luminescence from the user.

First in S170, the backlight control unit 122 determines whether there is sufficient lighting duration when the optical sensor value is acquired with lighting only a specific light source unit. In concrete terms, the backlight control unit 122 determines whether a single lighting duration of the specific light source unit is the time length required for the optical sensor to detect light (time length required for acquiring the optical sensor value in the amount of luminescence control processing) or more.

The lighting duration changes when the user performs the setting to adjust brightness of the image display apparatus (screen), for example. In concrete terms, it is assumed that the backlight brightness is 200 cd/m$^2$ when the target optical sensor value and the initial lighting duration are recorded. If the user adjusts the brightness of the image display apparatus, and drops the backlight brightness to 100 cd/m$^2$, the lighting duration of all the light source units is decreased to half. The backlight brightness may be adjusted by adjusting only the current value, or by adjusting both the lighting duration and the current value.

As mentioned above, when an optical sensor value is acquired, it is necessary that a state where only the specific light source unit is lit is maintained for a predetermined time length. This means that if the user radically drops the backlight brightness, the time length to acquire the optical sensor value may become insufficient. For example, if an actual lighting duration is 12 ms in a case where the lighting duration (lighting duration control value) exhibits 1000 and 1 ms is required for the optical sensor to detect light, the lighting duration of the specific light source unit must be 84 (=1000/12) or longer.

In S170, it is determined whether the lighting duration X of the specific light source unit is the time length required for the optical sensor to detect light, that is 84, or longer. The information on the time length required for the optical sensor to detect light is assumed to be recorded in the backlight 100 in advance. If the lighting duration X is less than 84 (S170: NO), processing advances to S171. If the lighting duration X is 84 or longer (S170: YES), processing advances to S173.

Figure 9:
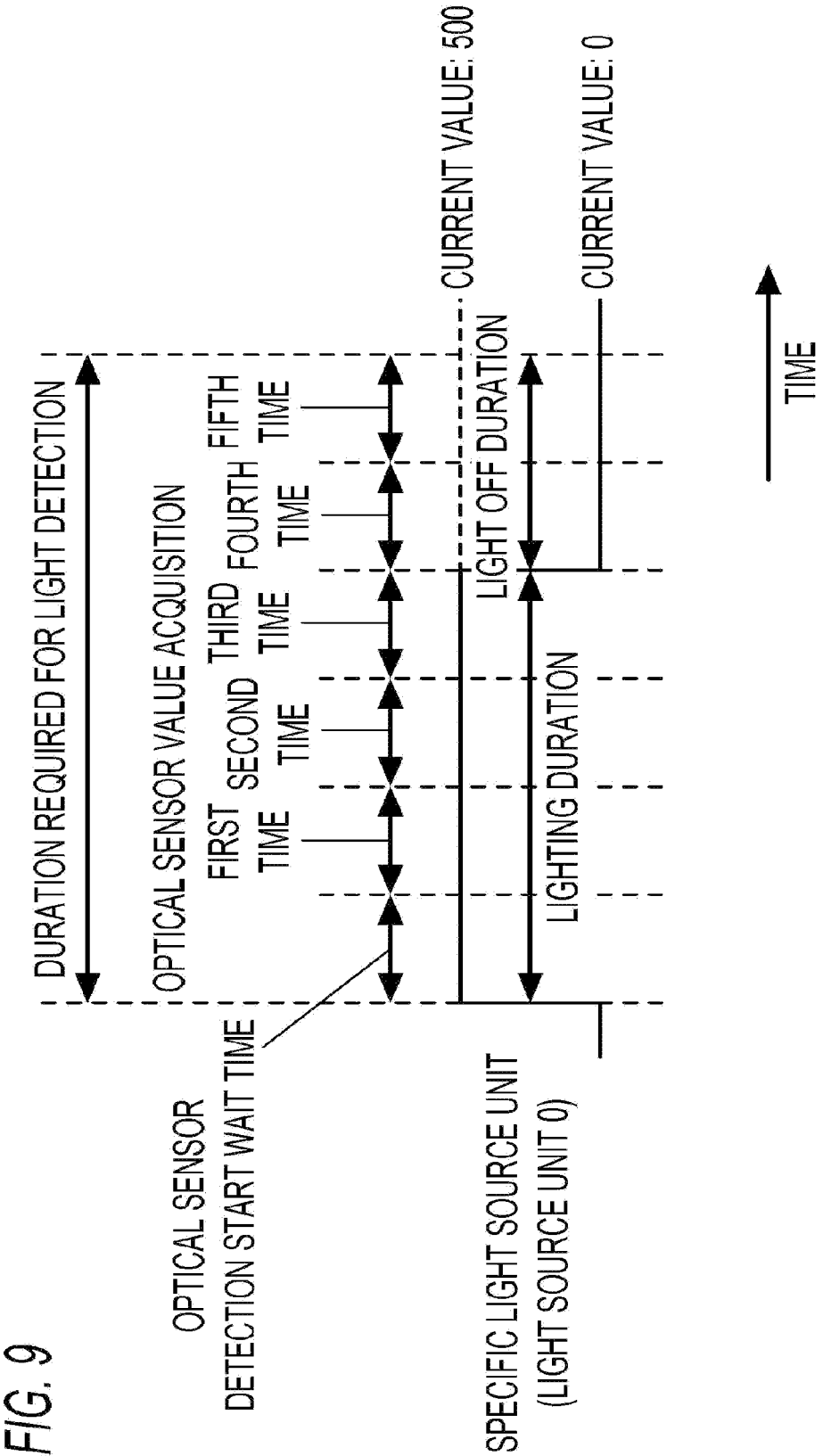
FIG. 9 shows an example of a lighting control for the light source unit during normal operation according to Embodiment 1.

In S171, the backlight control unit 122 executes extension processing to extend the lighting duration of the specific unit while the amount of luminescence control processing is performed, so that an accurate optical sensor value can be acquired in a state where only the specific light source unit is lit. The lighting duration is extended by the lighting duration adjustment unit 130. In concrete terms, the lighting duration is extended to a time length required for the optical sensor to detect light or longer. For example, as shown in FIG. 9 if the lighting duration before extension (preset lighting duration) of the specific light source unit is 50, which is shorter than the time length required for the optical sensor to detect light, an optical sensor value may not be acquired or an incorrect optical sensor value may be acquired. By the processing in S171, the lighting duration 50 is multiplied by 1.68. Thereby the lighting duration 50 is extended to duration 84, which is the same as the time length required for the optical sensor to detect light.

The lighting duration after extension need not match with the time length required for the optical sensor to detect light. The lighting duration after extension may be shorter or longer than the time length required for the optical sensor to detect light. In terms of the accuracy of detecting light, it is preferable that the lighting duration is extended to the time length required for the optical sensor to detect light or longer.

After S171, in S172 the backlight control unit 122 reduces the current value to be supplied to the specific light source unit so that an increase in the amount of luminescence due to an extension of the lighting duration in S171 is suppressed. The current value is reduced by the current value adjustment unit 131. In this embodiment, the value generated by multiplying the lighting duration after extension by the current value after reduction matches with the value generated by multiplying the lighting duration before extension by the current value before reduction. For example, if the lighting duration of the specific light source unit is extended to 1.68 times of the lighting duration in S171, the value of the current to be supplied to the specific light source unit is multiplied by 0.596 (=1/1.68). As a result, if the current value before reduction (preset current value) of the specific light source unit is 500, then the current value after reduction becomes 298.

After the processing in S172, processing advances to S173.

The current value reduction method is not limited to the above mentioned method. For example, the value generated by multiplying the lighting duration after extension by the current value after reduction may be greater than or smaller than the value generated by multiplying the lighting duration before extension by the current value before reduction. It is sufficient only if an increase in the amount of luminescence due to the extension of the lighting duration in S171 can be suppressed, and the degree of suppression does not matter.

Figure 10:
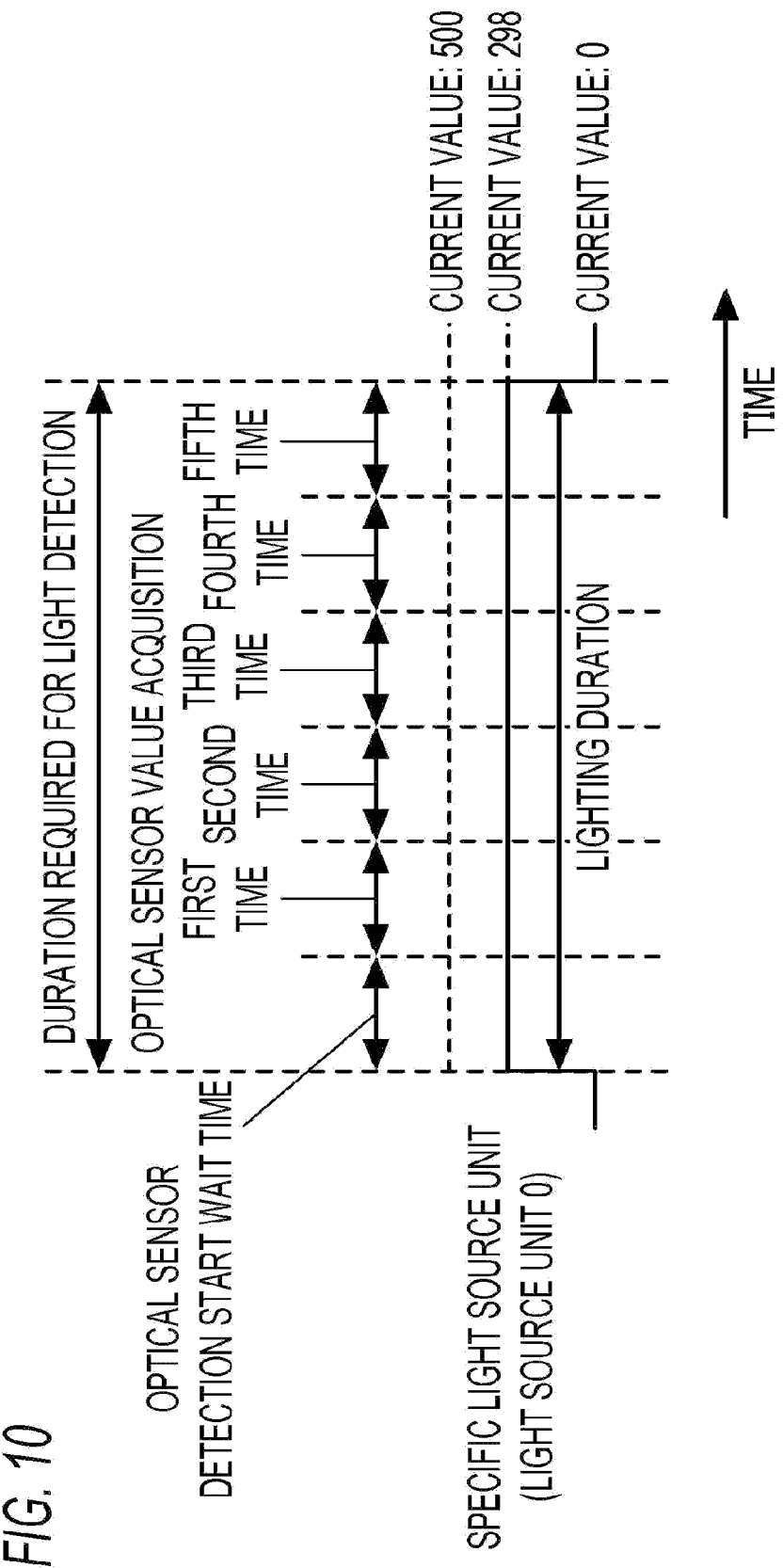
FIG. 10 shows an example of lighting control of the light source unit during optical sensor value detection according to Embodiment 1.

In S173, the backlight control unit 122 instructs the backlight driving unit 125 to generate a duration during when only a specific light source unit is lit. In concrete terms, if the determination in S170 is YES, it is instructed to generate a duration during when only the specific light source unit is lit with the preset lighting duration and the preset current value. If the determination in S170 is NO, it is instructed to generate a duration during when only the specific light source unit is lit with the lighting duration after extension and the current value after reduction (lighting duration determined in S171 and current value determined in S172). The backlight driving unit 125 generates a duration during when only the specific light source unit emits light responding to the instruction from the backlight control unit 122, and notifies the backlight control unit 122 that the duration during when only the specific light source unit emits light is generated. FIG. 10 shows an example of the lighting duration and the current value in this case. FIG. 10 is an example when the determination in S170 is NO, and an example when the lighting duration before extension and the current value before reduction are the values shown in FIG. 9.

When the backlight control unit 122 is notified by the backlight driving unit 125 that the duration during when only the specific light source unit is lit is generated, processing advances to S174. In S174, the backlight control unit 122 instructs the optical sensor value acquisition unit 121 to acquire the optical sensor value of the specific light source unit. The optical sensor value acquisition unit 121 acquires the optical sensor value from the optical sensor installed in the specific light source unit. As mentioned above, the optical sensor value is acquired for a plurality of times, and a representative value of the plurality of acquired optical sensor values is acquired as the final optical sensor value.

According to this embodiment, if a single lighting duration of the specific light source unit is shorter than the time length required for the optical sensor to detect light, the lighting duration is extended and the current value is reduced, as mentioned above. Therefore if the single lighting duration of the specific light source unit is shorter than the time length required for the optical sensor to detect the light, the detection result (optical sensor value) is acquired in S174 in a state where the lighting duration is extended and the current value is reduced.

If the single lighting duration of the specific light source unit is the time length required for the optical sensor to detect light or longer, then the detection result (optical sensor value) is acquired in the state where the light source unit is lit with the preset lighting duration and the preset current value.

Then in S175, the backlight control unit 122 acquires the target optical sensor value of the specific light source unit from the target optical sensor value storage unit 123.

By the processing in S176 and later, the amount of luminescence of each light source unit is controlled based on the optical sensor value acquired in S174. In concrete terms, if the determination in S170 is YES, the amount of luminescence of the light source unit is controlled based on the detection result (optical sensor value) in the state where the light source unit is lit with the preset lighting duration and the preset current value. If the determination in S170 is NO, the amount of luminescence of the light source unit is controlled based on the detection result (optical sensor value) in the state where the lighting duration is extended and the current value is reduced.

In concrete terms, if the current value is reduced in S172, the backlight control unit 122 adjusts the target optical sensor value according to the current value after reduction in S176. If the current value changes, the emission brightness (instantaneous value) changes accordingly. Considering such a change of the emission brightness, the target optical sensor value matching the emission brightness after the change is calculated in this processing. For example, it is assumed that the specific light source unit is a light source unit 0, for example. The target optical sensor value of the light source unit 0, when the current value of the light source unit 0 is 500, is 500 as shown in FIG. 7. According to this embodiment, the target optical sensor value is reduced to 298 (=(298/500)×500) to match the current value of the light source unit 0 after reduction, which is 298.

In S176, the backlight control unit 122 calculates a correction value, for the present lighting duration (hereafter "lighting duration correction value") from the optical sensor value which the backlight control unit 122 acquires in S174, and the target optical sensor value. If the current value is reduced in S172, then the target optical sensor value after the adjustment is used. The lighting duration correction value is a correction coefficient by which the preset lighting duration is multiplied to correct the change of the amount of luminescence. For example, it is assumed that the specific light source unit is the light source unit 0. If the optical sensor value acquired when only the light source unit 0 is lit is 250, then the lighting duration correction value is 1.192 (=298/250), since the target optical sensor value of the light source unit 0 is 298.

Then in S177, the backlight control unit 122 determines whether the lighting duration correction value is calculated for all the light source units. If the lighting duration correction value is calculated for all the light source units, processing advances to S178. If there is a light source of which the lighting duration correction value is not calculated, the light source unit of which the lighting duration correction value is not calculated is set as the specific light source unit. Then processing returns to S170.

In S178, the backlight control unit 122 calculates the preset lighting duration after correction (hereafter called "lighting duration after correction") for each light source unit. The lighting duration after correction is calculated by multiplying the preset lighting duration before correction by the lighting duration correction value. In concrete terms, if the preset lighting duration before correction of the light source unit 0 is 50 and the lighting duration correction value is 1.192, then the lighting duration after correction is 60 (=50×1.192).

The amount of luminescence may be corrected by correcting the preset current value, instead of the preset lighting duration, or the amount of luminescence may be corrected by correcting both the preset lighting duration and the preset current value.

Figure 11:
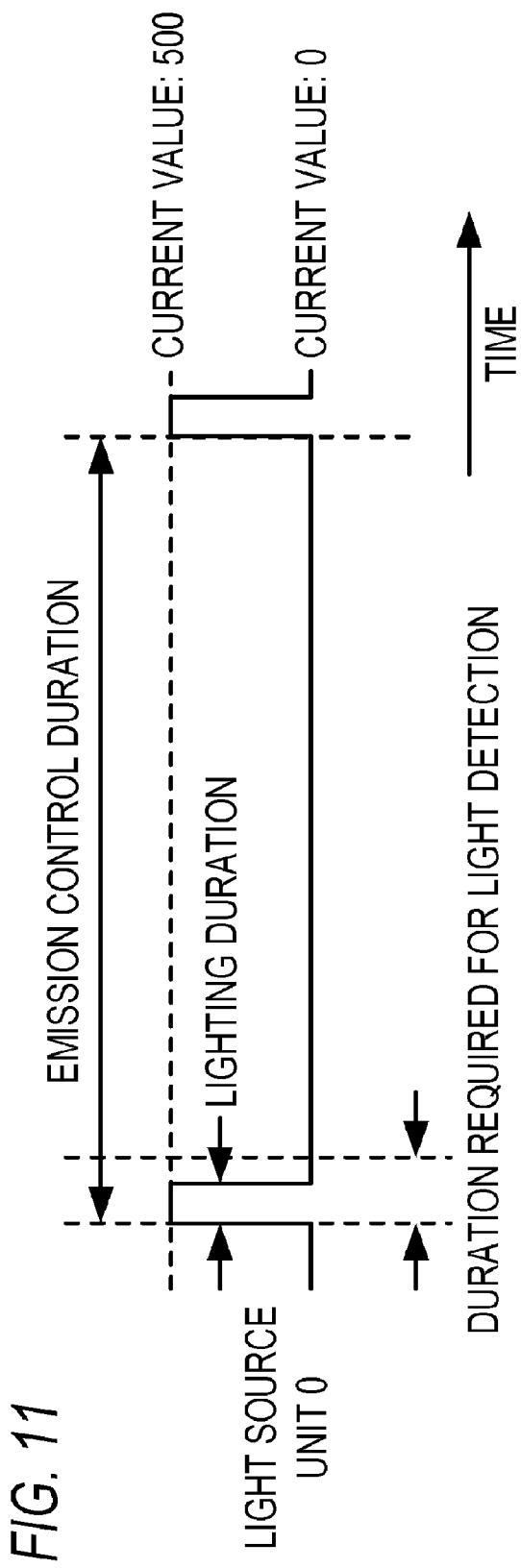
FIG. 11 shows an example of lighting control of the light source unit during normal operation according to Embodiment 1.
Figure 12:
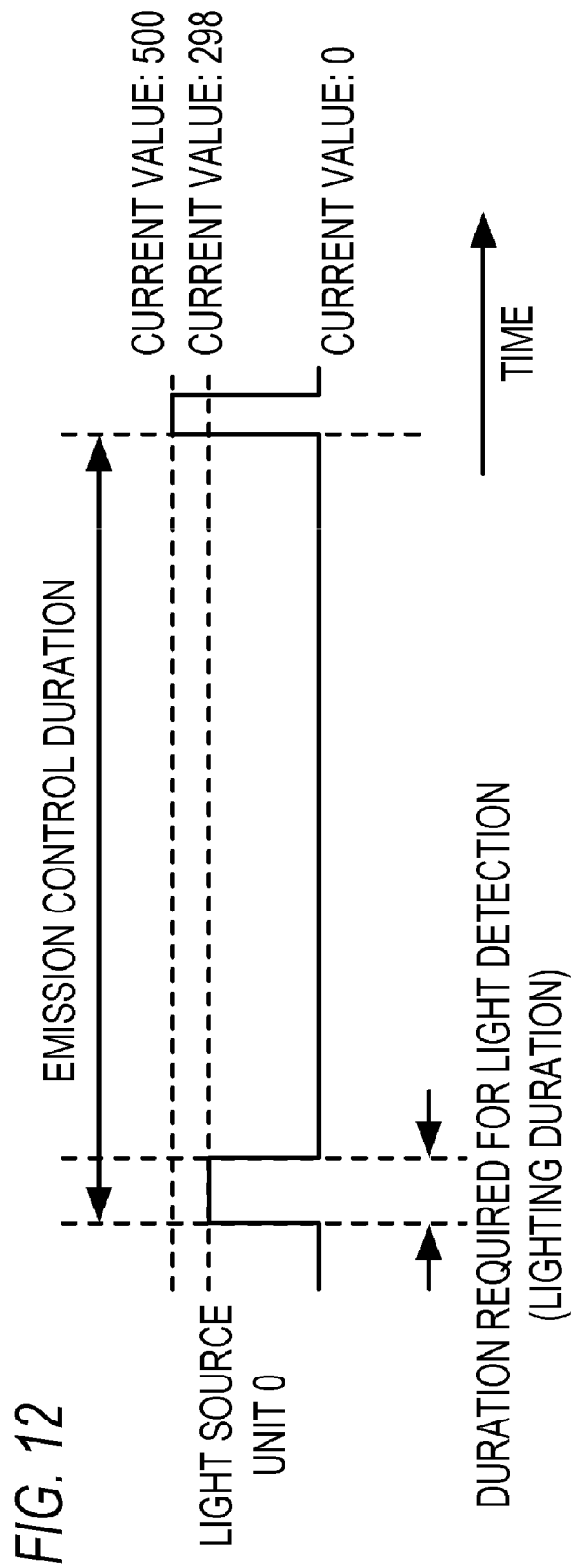
FIG. 12 shows an example of lighting control of the light source unit during the optical sensor value detection according to Embodiment 1.

As described above, according to this embodiment, even if the preset lighting duration is short and the optical sensor value cannot be acquired normally as shown in FIG. 11, a highly accurate optical sensor value can be acquired by changing the lighting duration as shown in FIG. 12. Therefor the amount of luminescence of each light source unit can be controlled (corrected by feedback control) at high precision, and the amount of luminescence of the entire backlight can be maintained at a constant level.

According to this embodiment, not only the lighting duration but also the current value is changed, hence the change of quantity of light caused by changing the lighting duration can be reduced, and a desired optical sensor value can be obtained. The change of display brightness (brightness on the screen) caused by changing the lighting duration can also be suppressed.

The light source may be one LED or a plurality of LEDs. The light source may be constituted by cold cathode tubes instead of LEDs.

According to this embodiment, an example of changing the emission brightness of the light source by changing the value of the current to be supplied to the light source was described, but the emission brightness of the light source may be changed by changing the value of the voltage to be applied to the light source.

Embodiment 2

A light source apparatus according to Embodiment 2 of the present invention and a control method thereof will now be described.

Some light sources have a characteristic that the emission efficiency changes by the change of the value of current to be supplied. An LED, for example, has such a characteristic. In this embodiment, an example of a case when the light source has such a characteristic and the correct value after reduction acquired in Embodiment 1 is corrected considering this characteristic will be described. If this correction is performed when the light source has such a characteristic, an optical sensor value of which accuracy is even higher than Embodiment 1 can be acquired, and the amount of luminescence of the light source apparatus can be controlled with higher precision than Embodiment 1.

First a configuration of the light source apparatus according to this embodiment will be described with reference to FIG. 13.

Figure 13:
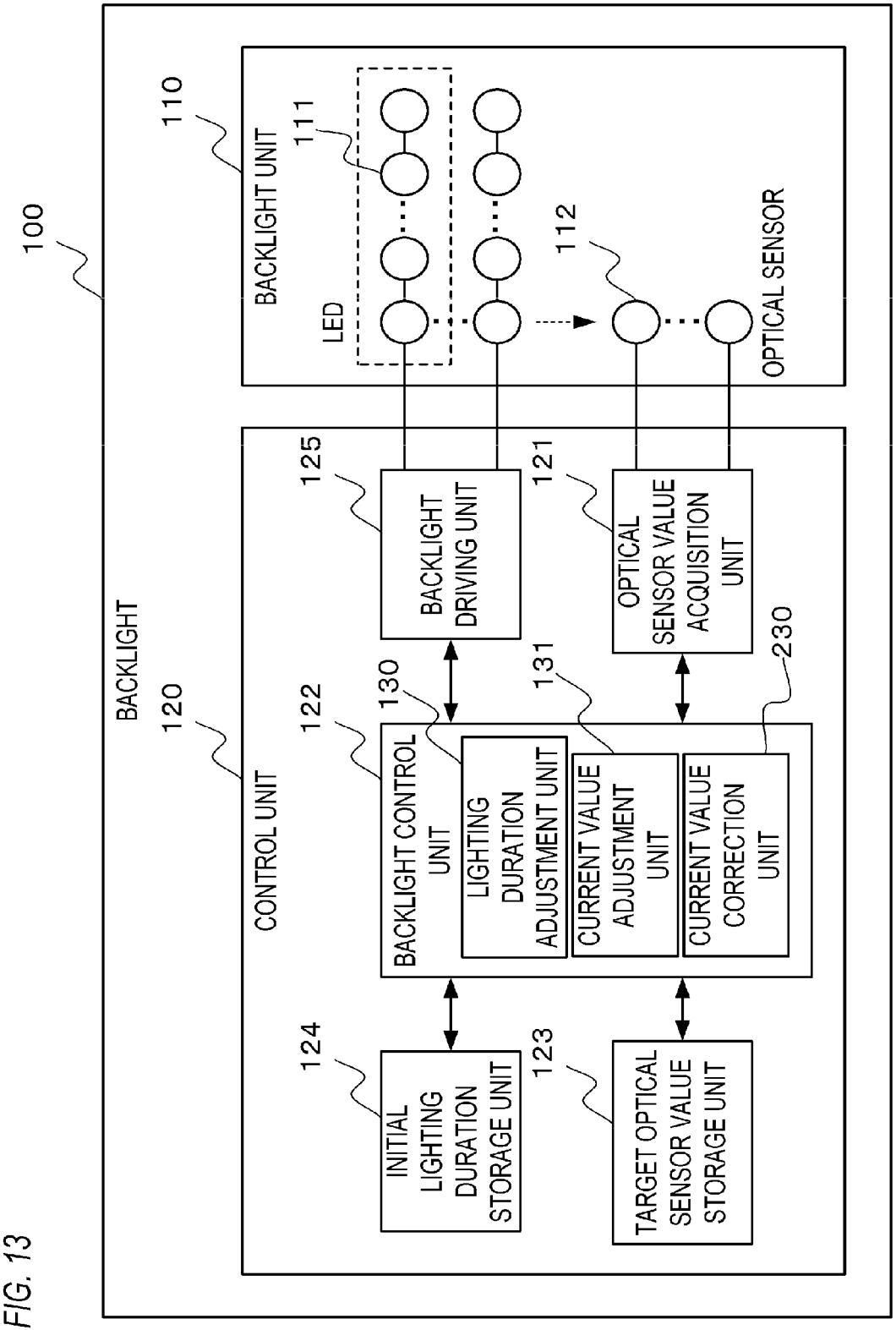
FIG. 13 is a block diagram depicting an example of a configuration of a light source apparatus according to Embodiment 2.

FIG. 13 is a block diagram depicting an example of the configuration of the light source apparatus according to this embodiment.

In FIG. 13, a functional block the same as Embodiment 1 (FIG. 1) is denoted with a same reference numeral, for which description is omitted.

The backlight control unit 122 according to this embodiment further includes a current value correction unit 230. When the lighting duration is extended and the current value is reduced to acquire an optical sensor value, the current value correction unit 230 corrects the current value after reduction (current value reduced by the current value adjustment unit 131), so that the amount of luminescence does not change. The emission efficiency of the light source unit changes by the current value adjustment unit 131 reducing the current value. As the emission efficiency changes the amount of luminescence changes as well. Based on the relationship between the current value and the emission efficiency, the current value correction unit 230 corrects the current value after reduction, so that the change of the amount of luminescence caused by the change of the emission efficiency is suppressed.

The method of recording the target optical sensor value and the initial emission duration is the same as Embodiment 1, therefore description thereof is omitted.

Figure 14:
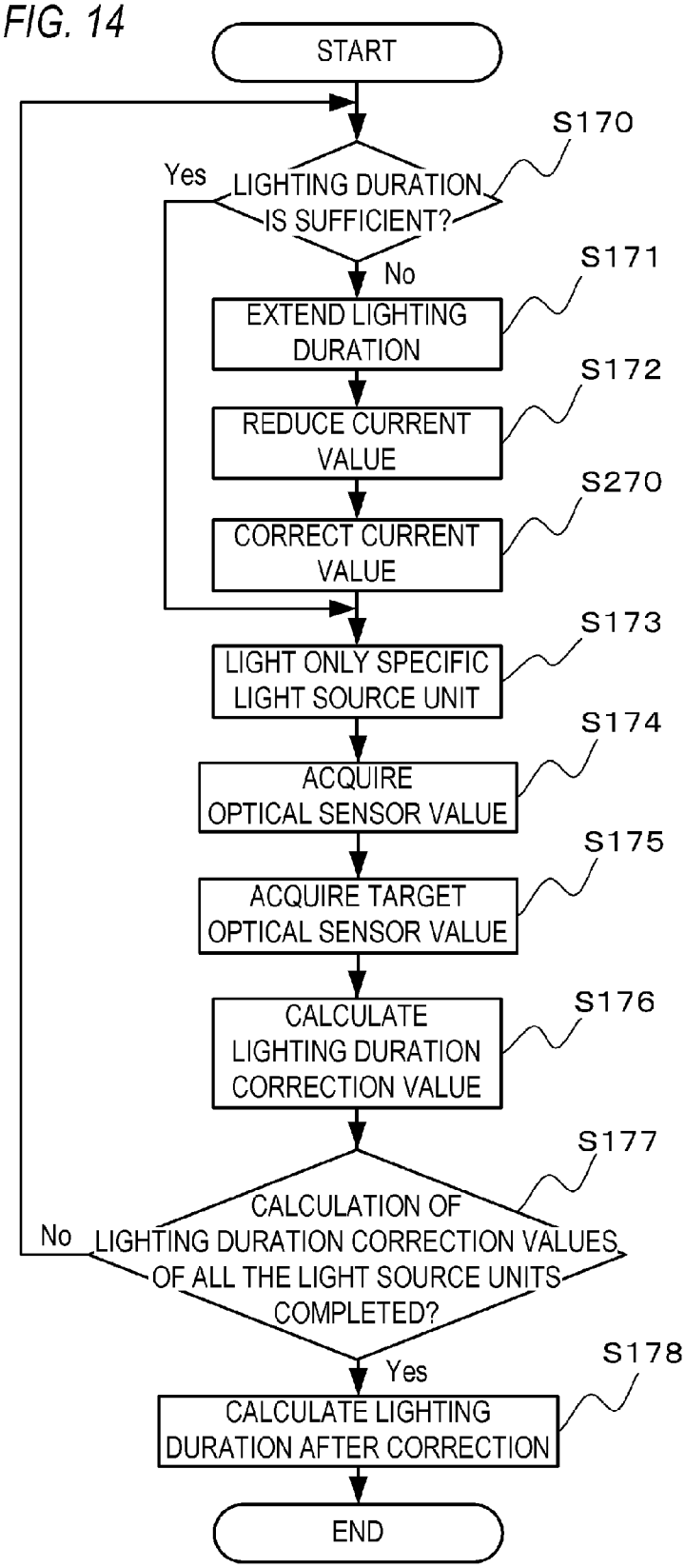
FIG. 14 is a flow chart depicting an example of an amount of luminescence control processing according to Embodiment 2.

Now a method of controlling the amount of luminescence of the backlight 100 according to this embodiment (the amount of luminescence control processing) will be described with reference to FIG. 14. FIG. 14 is a flowchart depicting an example of a method of controlling then amount of luminescence of the backlight 100 according to this embodiment, specifically a method of keeping the amount of luminescence (brightness) of the entire backlight 100 constant. The processing flow in FIG. 14 is executed at predetermined intervals when the user uses the image display apparatus, for example.

In FIG. 14, a processing the same as Embodiment 1 (FIG. 8) is denoted with a same reference symbol, for which description is omitted.

In this embodiment, the processing in S270 is performed after the processing in S172, and after the processing in S270, processing advances to S173.

In S270, the backlight control unit 122 corrects the current value after reduction (current value reduced in S172) using the current value correction unit 230.

Figure 15:
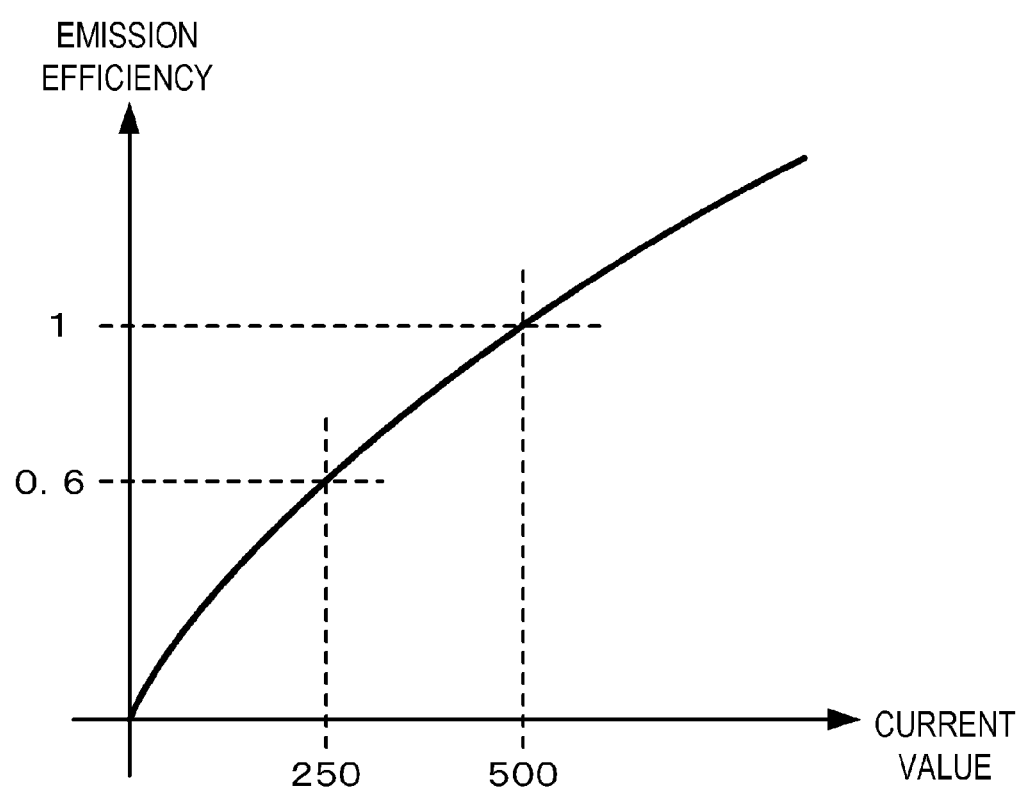
FIG. 15 shows an example of a relationship between a current value and an emission efficiency according to Embodiment 2.

As mentioned above, some light source units (specifically such light emitting elements as LEDs) have a characteristic where the emission efficiency changes as the value of current to be supplied changes. For example, some light source units have the characteristic shown in FIG. 15. According to the characteristic in FIG. 15, the emission efficiency is 1 when the current value is 500, and the emission efficiency is 0.6 when the current value is 250. Such a characteristic must be considered in order to control (correct) the amount of luminescence of the backlight 100 at high precision.

The current value correction unit 230 has a correction table shown in FIG. 16, for example. The correction table in FIG. 16 is a table to show the relationship between the current value and the correction value. In concrete terms, the correction table in FIG. 16 shows each current value after reduction and a correction value (current correction value) corresponding to the current value. The current correction value is a correction coefficient by which each current value after reduction is multiplied, in order to suppress the change of the amount of luminescence caused by the change of the emission efficiency. In this embodiment, a current correction value corresponding to a current value that does not exist in the correction table is calculated by interpolation. For the current correction value corresponding to a current value that does not exist in the correction table, a current correction value corresponding to a current value that is closest to the current value that exists in the correction table may be used. If the current value after reduction is 298, the current value 298 after reduction is corrected to a current value 277 (=((298−290)×(0.93−0.92)/(300−290)+0.92)×298) by the processing in S270.

The current correction value may be calculated using a function that represents the relationship between the current value and the emission efficiency (function that represents the relationship between the current value after reduction and the current correction value), instead of determining the current correction value using the correction table. The current value after reduction may be corrected using a table or a function that represents the relationship between a current value before correction and a current value after correction.

Figure 17:
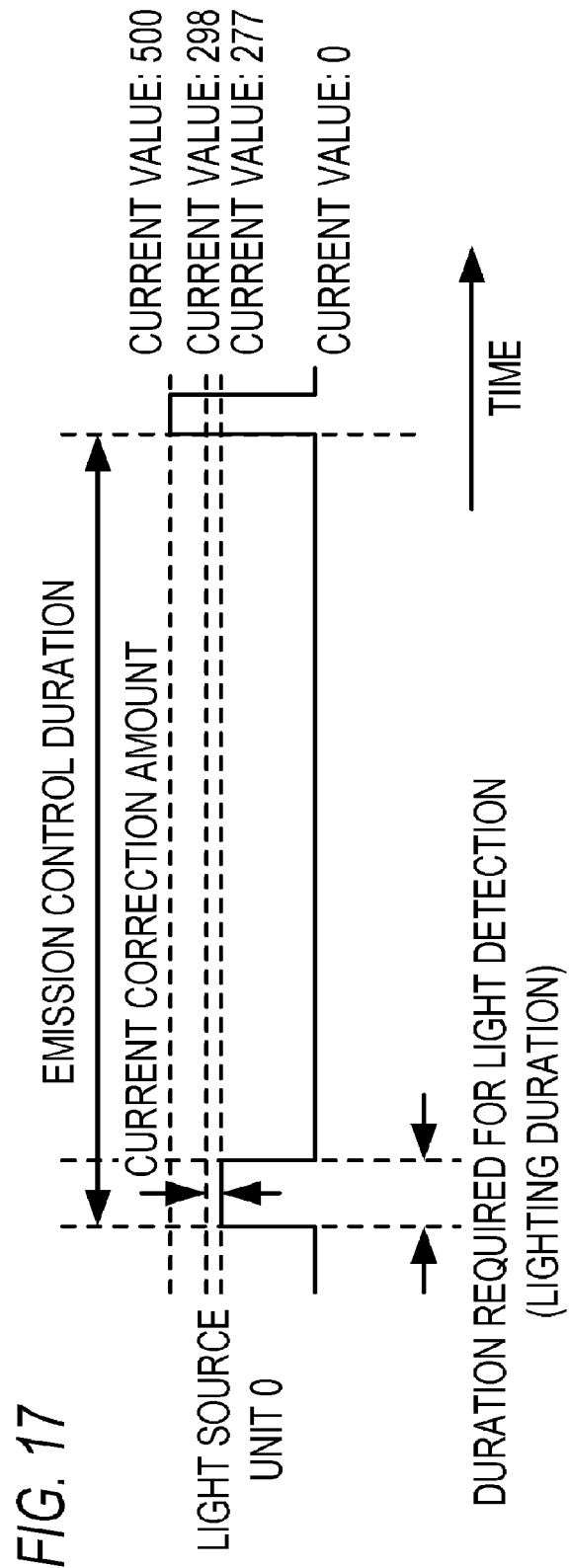
FIG. 17 shows an example of lighting control of a light source unit during the optical sensor value detection according to Embodiment 2.

As described above, according to this embodiment, even if the preset lighting duration is short and the optical sensor value cannot be acquired normally as shown in FIG. 11, a highly accurate optical sensor value can be acquired by changing the lighting duration and the current value as shown in FIG. 17. Further, even if the emission efficiency changes due to the change of the current value, a highly accurate optical sensor value can be acquired by correcting the current value after reduction. Therefore the amount of luminescence of each light source unit can be controlled (corrected) at high precision, and the amount of luminescence of the entire backlight can be maintained at a constant level. In concrete terms, if the emission efficiency changes due to the change of current value, an optical sensor value that is at higher precision than Embodiment 1 can be acquired, and the amount of luminescence of the light source apparatus can be controlled at higher precision than Embodiment 1.

According to the configuration of this embodiment, the current value after reduction is corrected based on the relationship between the current value and the emission efficiency, but the present invention is not limited to this. For example, the acquired optical sensor value may be corrected based on the relationship between the current value and the emission efficiency, so that the change of the optical sensor value caused by the change of the emission efficiency is suppressed. The amount of luminescence after correction (preset lighting duration of correction) determined by the method of Embodiment 1 may be corrected based on the relationship between the current value and the emission efficiency. However if the current value after reduction is corrected, a dramatic change in the amount of luminescence during the amount of luminescence control processing can be suppressed.

Embodiment 3

A light source apparatus according to Embodiment 3 of the present invention and a control method thereof will now be described. In this embodiment, an example when the lighting duration after extension and the current value after reduction are predetermined will be described.

First a configuration of the light source apparatus according to this embodiment will be described with reference to FIG. 18.

Figure 18:
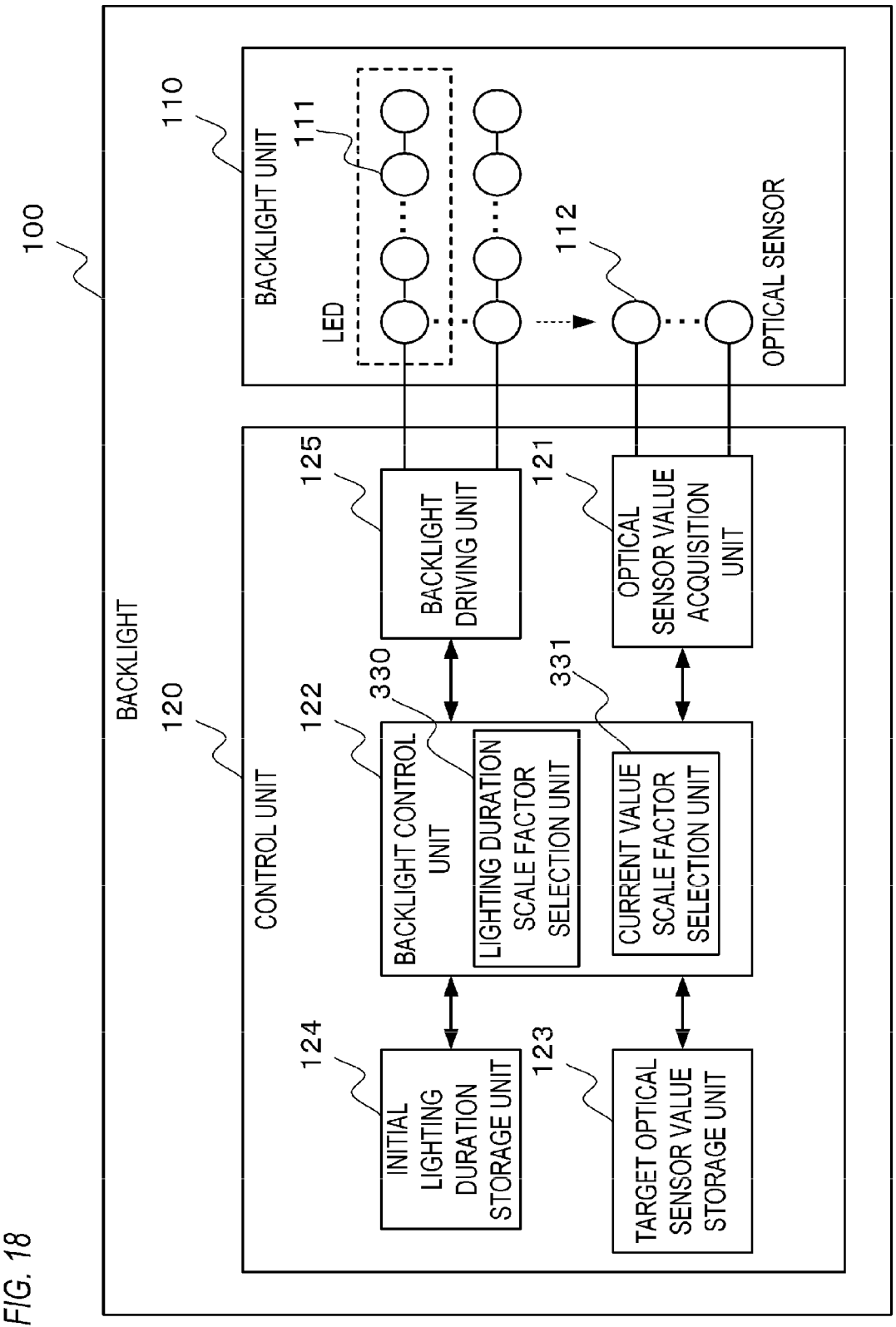
FIG. 18 is a block diagram depicting an example of a configuration of a light source apparatus according to Embodiment 3.

FIG. 18 is a block diagram depicting an example of the configuration of the light source apparatus according to this embodiment.

In FIG. 18, a functional block the same as Embodiment 1 (FIG. 1) is denoted with a same reference numeral, for which description is omitted.

The backlight control unit 122 according to this embodiment includes a lighting duration scale factor selection unit 330 and a current value scale factor selection unit 331.

In the lighting duration scale factor selection unit 330, a table to show a lighting duration after extension for each setup lighting duration has been recorded in advance. The lighting duration scale factor selection unit 330 extends the preset lighting duration to the lighting duration after extension which corresponds to the current present lighting duration in this table. According to this embodiment, a table to show a scale factor of a preset lighting duration for each preset lighting duration has been recorded as shown in FIG. 20, and the preset lighting duration is extended by being multiplied by the corresponding scale factor.

In the current value scale factor selection unit 331, a table to show a current value after reduction for each preset lighting duration has been recorded in advance. The current value scale factor selection unit 331 reduces the preset current value to the current value after reduction which corresponds to the current preset lighting duration in this table. According to this example, a table to show a scale factor of a preset current value for each preset lighting duration has been recorded as shown in FIG. 21, and the preset current value is reduced by being multiplied by the corresponding scale factor.

For each preset lighting duration, not a scale factor, but a lighting duration after extension itself or a current value after reduction itself may be corresponded. One table that indicates the lighting duration after extension and the current value after reduction for each preset lighting duration may be recorded. A function may be recorded instead of the table.

The method of recording the target optical sensor value and the initial emission duration is the same as Embodiment 1, therefore description thereof is omitted.

Figure 19:
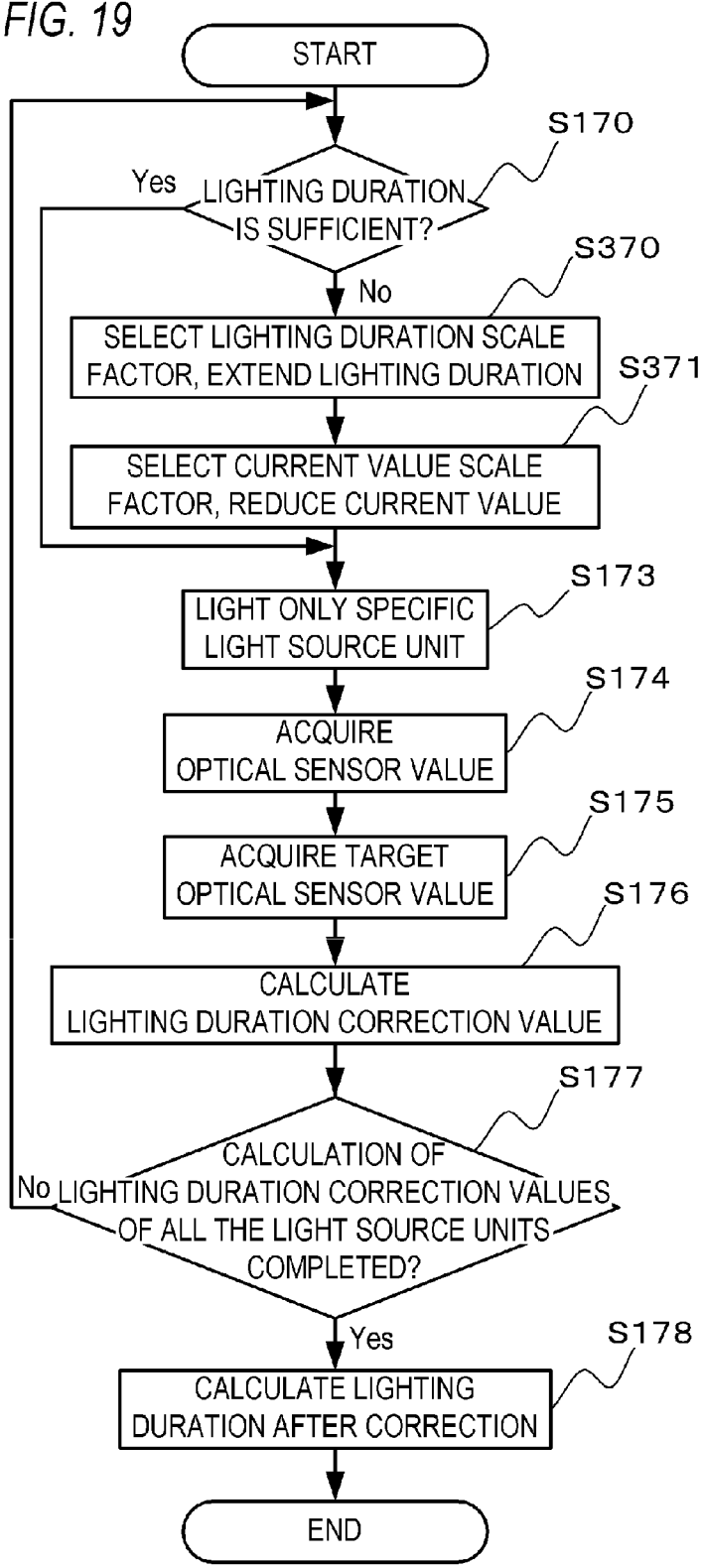
FIG. 19 is a flow chart depicting an example of an amount of luminescence control processing according to Embodiment 3.

Now a method of controlling the amount of luminescence of the backlight 100 according to this embodiment (the amount of luminescence control processing) will be described with reference to FIG. 19. FIG. 19 is a flow chart depicting an example of a method of controlling the amount of luminescence of the backlight 100 according to this embodiment, specifically a method of keeping the amount of luminescence (brightness) of the entire backlight 100 constant. The processing flow in FIG. 19 is executed at predetermined intervals when the user uses the image display apparatus, for example.

In FIG. 19, a processing the same as Embodiment 1 (FIG. 8) is denoted with a same reference symbol, for which description is omitted.

In this embodiment, the processing in S370 and S371 is performed, instead of the processing S171 and S172 in FIG. 8.

In S370, the backlight control unit 122 selects a scale factor to extend the preset lighting duration, and extends the preset lighting duration using the lighting duration scale factor selection unit 330. In concrete terms, a scale factor corresponding to the current preset lighting duration is selected from the table in FIG. 20. Then the preset lighting duration is extended by multiplying the current preset lighting duration by the selected scale factor. If the current preset emission duration is 50, the scale factor is 5, and the lighting duration after extension is 250 (=50×5).

In S371, the backlight control unit 122 selects a scale factor to reduce the preset current value and reduce the preset current value using the current value scale factor selection unit 331. In concrete terms, a scale factor corresponding to the current preset current value is selected from the table in FIG. 21. Then the preset current value is reduced by multiplying the current preset current value by the selected scale factor. If the current preset emission duration is 50 and the current preset current value is 500, the scale factor is 1/5 and the current value after reduction is 100 (=500×1/5).

Figure 22:
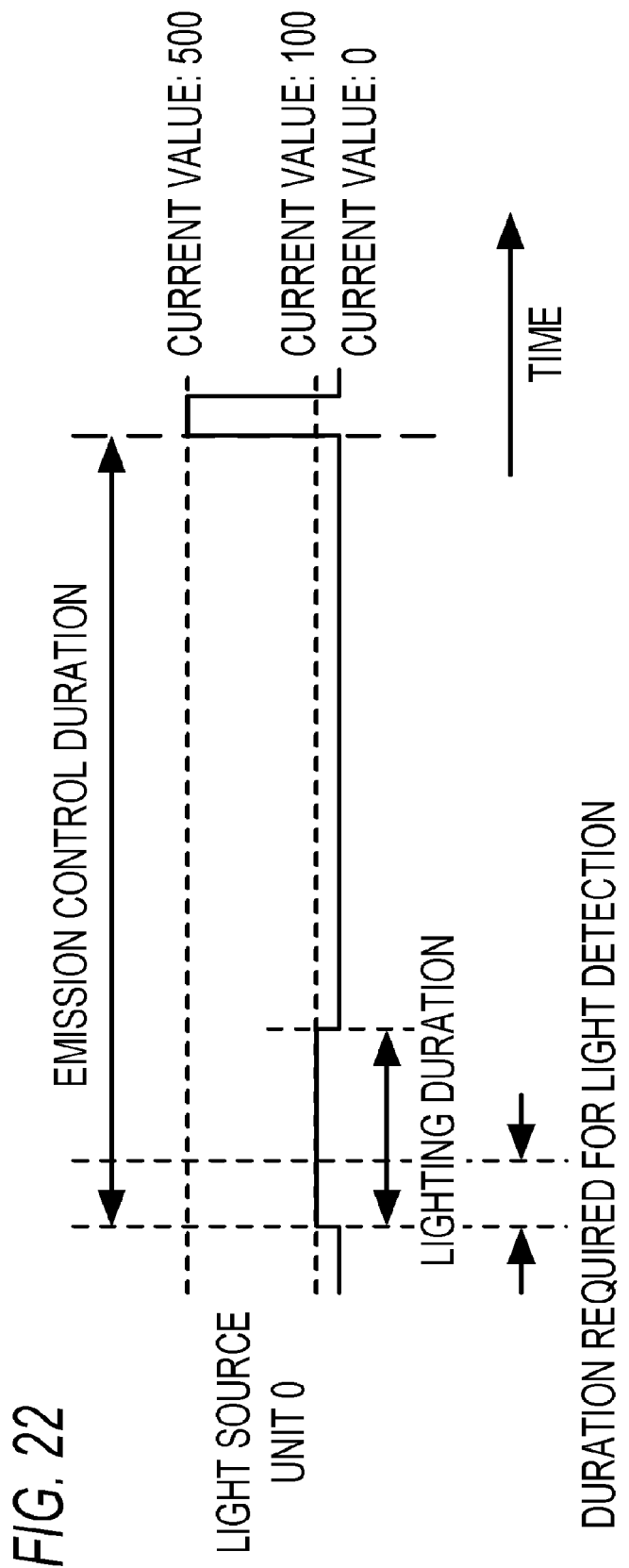
FIG. 22 shows an example of lighting control of the light source unit during optical sensor value detection according to Embodiment 3.

As described above, according to this embodiment, even if the preset lighting duration is short and the optical sensor value cannot be acquired normally as shown in FIG. 11, a highly accurate optical sensor value can be acquired by changing the lighting duration and the current value as shown in FIG. 22. Therefore the amount of luminescence of each light source unit can be controlled (corrected) at high precision, and the amount of luminescence of the entire backlight can be maintained at a constant level.

Embodiment 4

A light source apparatus according to Embodiment 4 of the present invention and a control method thereof will now be described.

Some light sources have a characteristic that the emission efficiency changes by the change of the temperature inside the elements of the light source (temperature of the light source itself; light source temperature). For example, an LED has a characteristic that the emission efficiency decreases as the temperature inside the element increases, and the emission efficiency increases as the temperature inside the element decreases. In this embodiment, an example of a case, when the light source has such a characteristic and the control to extend the lighting duration and to reduce the current value is performed considering this characteristic, will be described.

First a configuration of the light source apparatus according to this embodiment will be described with reference to FIG. 23 and FIG. 24.

Figure 23:
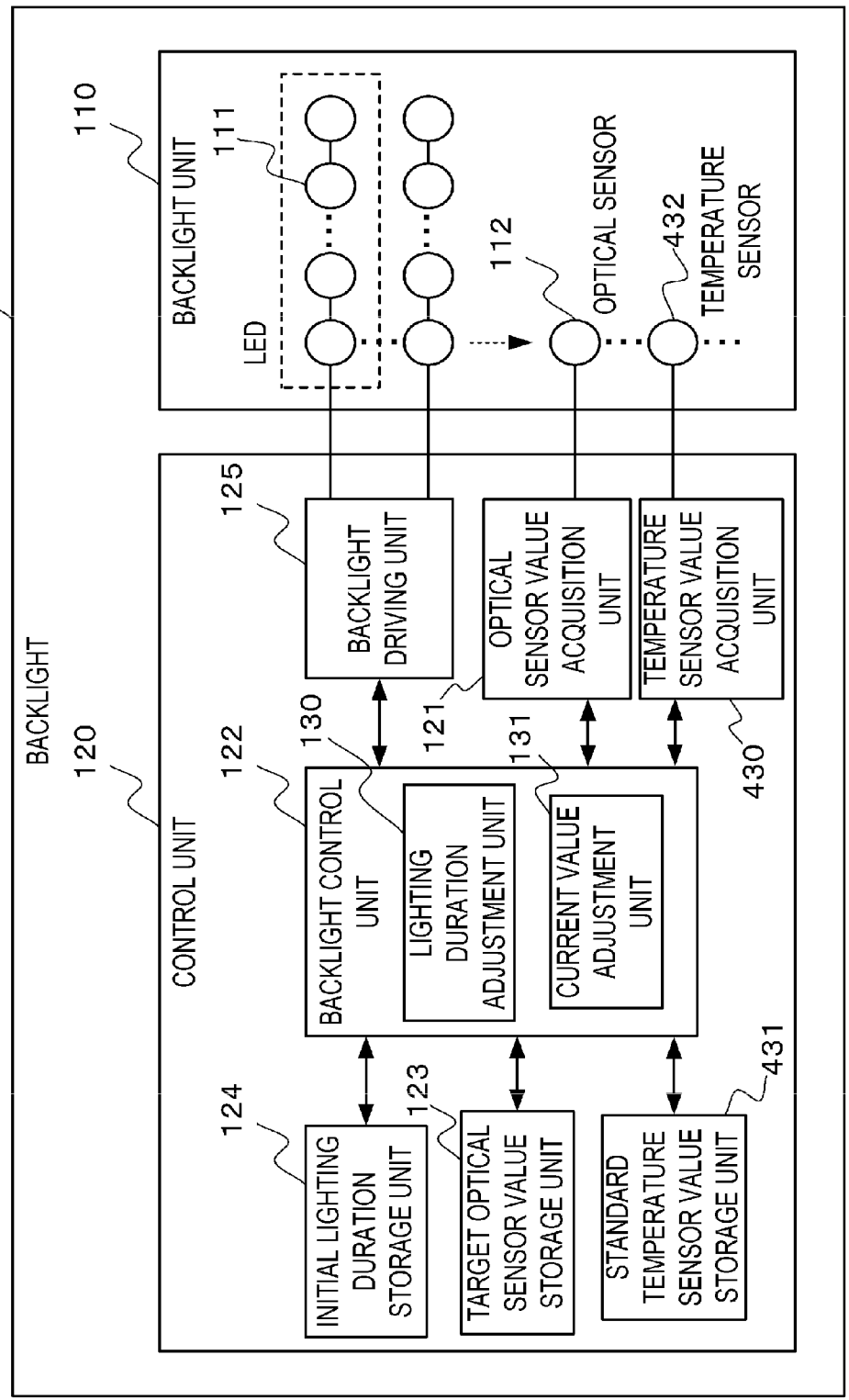
FIG. 23 is a block diagram depicting an example of a configuration of a light source apparatus according to Embodiment 4.
Figure 24:
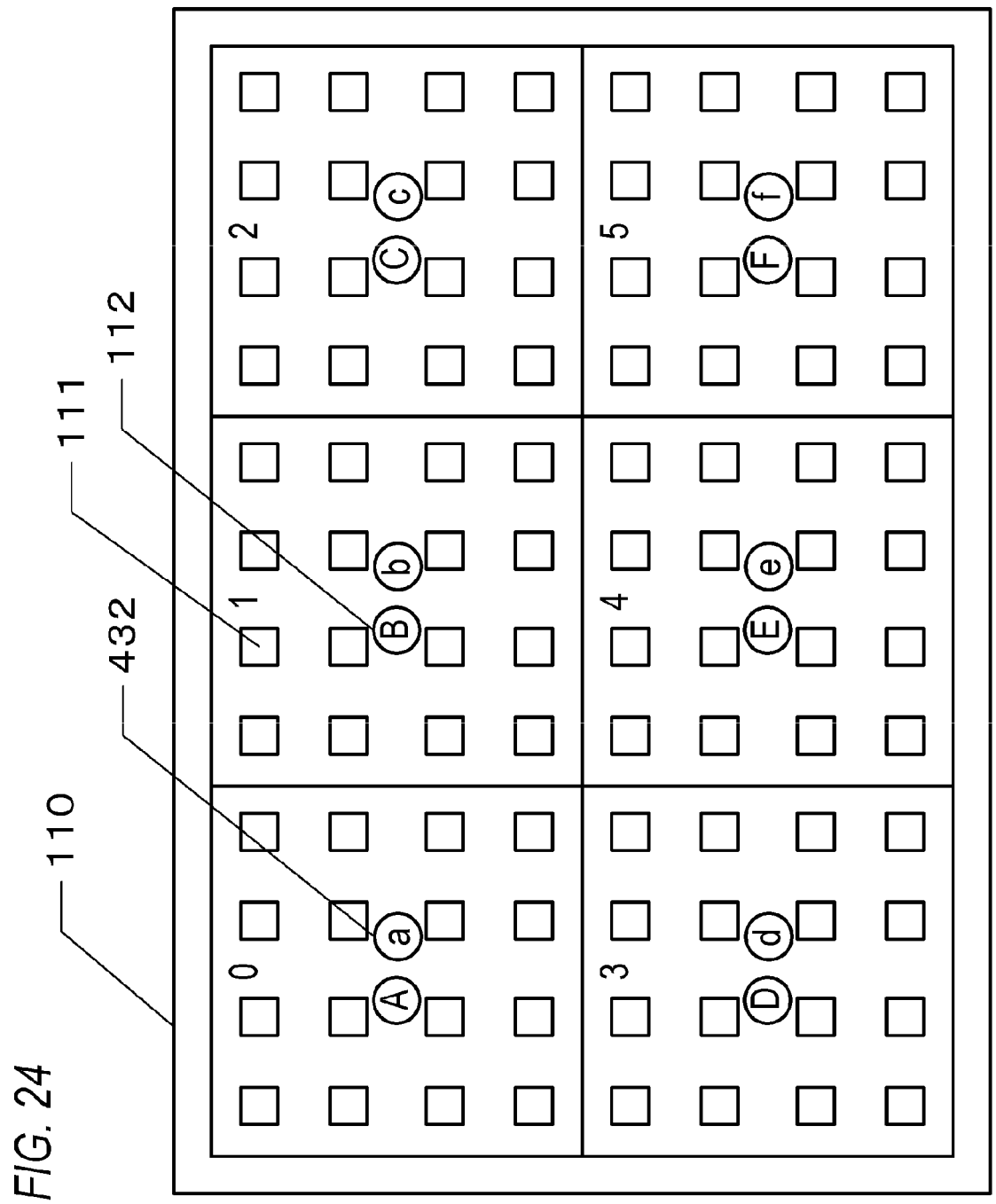
FIG. 24 is a schematic diagram depicting an example of a configuration of a backlight unit according to Embodiment 4.

FIG. 23 is a block diagram depicting an example of the configuration of the light source apparatus according to this embodiment. FIG. 24 is a schematic diagram depicting an example of the configuration of a backlight unit according to this embodiment.

In FIG. 23, a functional block the same as Embodiment 1 (FIG. 1) is denoted with a same reference numeral, for which description is omitted.

The light emitting apparatus 100 according to this embodiment further includes a temperature sensor value acquisition unit 430 in addition to the optical sensor value acquisition unit 121. Responding to an instruction from the backlight control unit 122, the temperature sensor value acquisition unit 430 acquires a temperature sensor value of each light source unit from a temperature sensor 432 (temperature sensor a to f) installed for each light source unit, as shown in FIG. 24. In this embodiment, extension of the lighting duration and reduction of the current value are controlled based on the temperature sensor value acquired by the temperature sensor value acquisition unit 430. The temperature sensor value is a centigrade temperature when the optical sensor value is acquired, for example. To be precise, the temperature sensor value is a temperature around the measurement target light source, and is not the light source temperature, but since the temperature sensor value changes based on the change of the light source temperature, the temperature sensor value is interpreted as the light source temperature in this description, so that description is simpler.

The light emitting apparatus 100 according to this embodiment further comprises a standard temperature sensor value storage unit 431 in addition to the target optical sensor value storage unit 123. In the standard temperature sensor value storage unit 431, a temperature sensor value when the target optical sensor value is acquired in the adjusting step during production has been recorded as the standard temperature sensor value.

Figure 25:
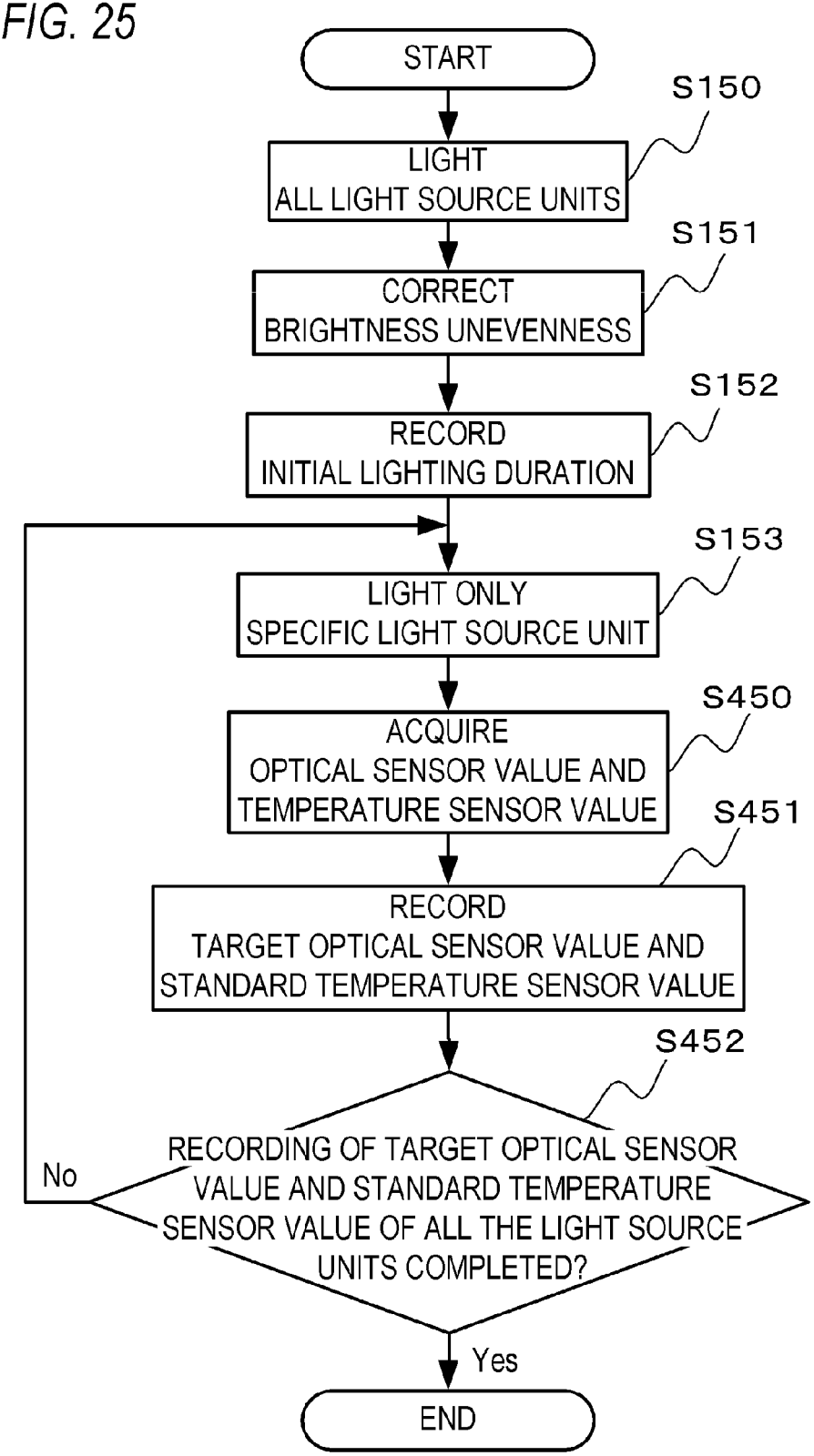
FIG. 25 is a flow chart depicting an example of a method of recording a target optical sensor value and initial lighting duration according to Embodiment 4.

Now a method of recording the target optical sensor value, the standard temperature sensor value and the initial lighting duration according to this embodiment will be described with reference to FIG. 25. FIG. 25 is a flowchart depicting an example of the method of recording the target optical sensor value, the standard temperature sensor value and the initial lighting duration. The processing flow in FIG. 25 is executed in the adjustment step during production. It is assumed that the adjustment step during production according to this embodiment is executed in a predetermined temperature environment.

In FIG. 25, a processing the same as Embodiment 1 (FIG. 8) is denoted with a same reference symbol, for which description is omitted.

In this embodiment, the processing from S150 to S153 is the same as Embodiment 1, therefore description thereof is omitted.

When the backlight driving unit 125 notifies the backlight control unit 122 that a duration during when only a specific light source unit is lit is generated in S153, processing advances to S450. In S450, the backlight control unit 122 instructs the optical sensor value acquisition unit 121 to acquire an optical sensor value of the specific light source unit, and instructs the temperature sensor value acquisition unit 430 to acquire the temperature sensor value. The optical sensor value acquisition unit 121 acquires the optical sensor value from the optical sensor 112 (first detection unit) installed in the specific light source unit, and the temperature sensor value acquisition unit 430 acquires a temperature sensor value from a temperature sensor 432 (second detection unit). In this embodiment, just like Embodiment 1, the optical sensor value is acquired for a plurality of times to remove noise. And a representative value (e.g. mean value, mode value, median value) of the acquired plurality of optical sensor values is acquired as a final optical sensor value. In this embodiment, just like Embodiment 1, a time lag is generated until light from the specific unit is detected in a state where only the specific light source unit is lit. Therefore in order to determine a final optical sensor value, the state when only the specific light source unit is lit must be maintained to a degree.

Then in S451, the backlight control unit 122 records the optical sensor value acquired in S450 in the target optical sensor value storage unit 123 as the target optical sensor value. The backlight control unit 122 also records the temperature sensor value acquired when the optical sensor value is acquired in the standard temperature sensor value storage unit 431 as the standard temperature sensor value.

Then in S452, the backlight control unit 122 determines whether the target optical sensor values and the standard temperature sensor values of all the light source units are recorded. If the target optical sensor values and the standard temperature sensor values of all the light source units are recorded, this processing flow ends. If there is a light source unit of which target optical sensor value and standard temperature sensor value are not recorded, the backlight control unit 122 sets the light source unit of which target optical sensor value is not recorded as the specific light source unit mentioned above. Then processing returns to S153.

FIG. 26 shows an example of a target optical sensor value and standard temperature sensor value of each light source unit that are determined like this.

In this embodiment, a case when the user can set an upper limit value (maximum brightness) of the brightness of the backlight 100 in a plurality of levels (e.g. five levels: 50 cd/m$^2$, 100 cd/m$^2$, 200 cd/m$^2$, 300 cd/m$^2$ and 400 cd/m$^2$) will be described. Further, a case when the backlight 100 is used at the maximum brightness 200 cd/m$^2$, which is set by the user, will be described. It is assumed that 500 is set as the current value of each light source unit, and that 500 is set as the lighting duration of each light source unit, in order to acquire a brightness of 200 cd/m$^2$.

According to this embodiment, it is assumed that each maximum brightness that can be set for the image display apparatus is calculated and recorded in advance, such as cases of the backlight 100 emitting with a maximum brightness of 50 cd/m$^2$, with a maximum brightness of 100 cd/m$^2$, with a maximum brightness of 300 cd/m$^2$ and with a maximum brightness of 400 cd/m$^2$. It is not always necessary to calculate the target optical sensor value and the standard temperature sensor value of each light source unit for a plurality of maximum brightness values. For example, in the case when the backlight 100 is emitted with a maximum value of a plurality of maximum brightness values that can be set (400 cd/m$^2$ in the case of this embodiment), the target optical sensor value and the standard temperature sensor value may be calculated only for one maximum brightness. In this case, the target optical sensor values and the standard temperature sensor values at the other maximum brightness values can be calculated by multiplying the target optical sensor value and the standard temperature value calculated at the maximum value of the maximum brightness by a predetermined correction coefficient.

The above mentioned maximum brightness is synonymous with the upper limit value of the display brightness.

Figure 27:
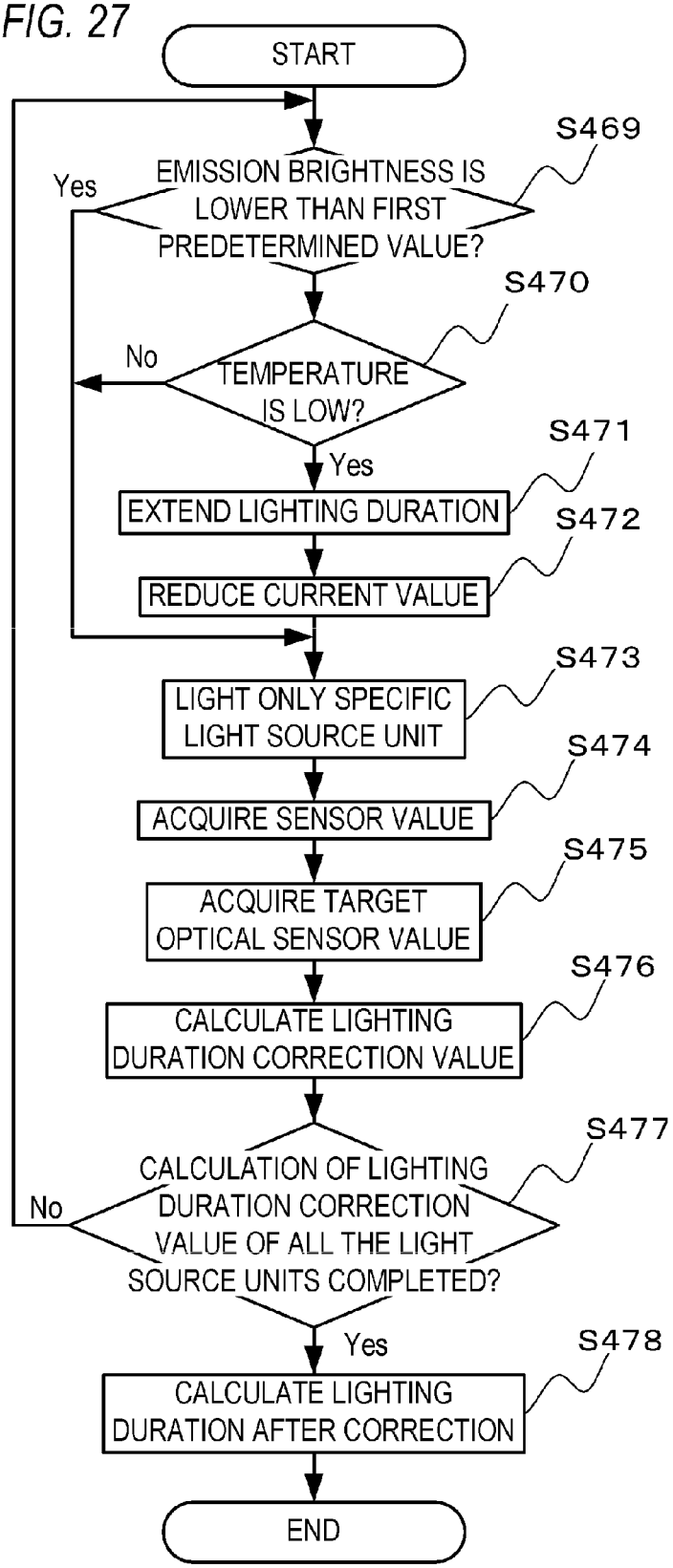
FIG. 27 is a flow chart depicting an example of an amount luminescence control processing according to Embodiment 4.

Now a method of controlling the amount of luminescence of the backlight 100 (amount of luminescence control processing) according to this embodiment will be described with reference to FIG. 27. FIG. 27 is a flow chart depicting an example of a method of controlling the amount of luminescence of the backlight 100 according to this embodiment, in concrete terms, a method of maintaining the amount of luminescence (brightness) of the entire backlight 100. The processing flow in FIG. 27 is performed when the user uses the image display apparatus, for example, at predetermined intervals. As mentioned above, in this embodiment, a case when the user uses the image display apparatus, setting the maximum brightness of the image display apparatus to 200 cd/m$^2$ will be described.

In this embodiment, first in S469, it is determined whether the emission brightness of a specific light source unit, for which the amount of luminescence is corrected (feedback control is performed) is lower than a first predetermined brightness (e.g. 60 cd/m$^2$). If the emission brightness of the specific light source unit is lower than the first predetermined brightness (S469: YES), processing advances to S470. If the emission brightness of the specific light source unit is the first predetermined brightness or more (S469: NO), processing advances to S473. The reason why processing advances to S470 when the emission brightness of the specific light source unit is lower than the first predetermined brightness (S469: YES) will be described later.

Then in S470, when an optical sensor value is acquired allowing only a specific light source unit to light, the backlight control unit 122 determines whether the temperature sensor value acquired by the temperature sensor value acquisition unit 430 is lower than a standard temperature sensor value by a predetermined value or more. In other words, in S470, when an optical sensor value is acquired allowing only a specific light source unit to light, the backlight control unit 122 determines whether the temperature sensor value acquired by the temperature sensor value acquisition unit 430 is a predetermined temperature or less. The predetermined temperature here is a temperature lower than the standard temperature sensor value by a predetermined value. The standard temperature sensor value is a standard temperature sensor value corresponding to the maximum brightness that is set by the user in advance. In concrete terms, the maximum brightness has been set to 200 cd/m$^2$ by the user. In this embodiment, therefore a value shown in FIG. 26 is used for the standard temperature sensor value.

The lighting duration of the light source changes according to the input image data, for example. In concrete terms, it is assumed that the backlight brightness is 200 cd/m$^2$ when the target optical sensor value and the initial lighting duration of a full white image data are recorded. And it is assumed that the lighting duration of all the light source units is reduced to half if the backlight brightness drops to 100 cd/m$^2$ according to the image data. However if the lighting duration is decreased so that the backlight brightness drops, the temperature of the light source itself drops and the emission efficiency increases. Therefore according to this embodiment, the backlight brightness is adjusted to 100 cd/m$^2$ by further decreasing the lighting duration of the light source considering the change of the emission efficiency caused by the change of temperature of the light source itself.

In this embodiment, it is assumed that the lighting duration required for the optical sensor to detect light is 84 or longer, just like Embodiment 1. Further, in this embodiment, information representing the relationship of the light source temperature, a lighting duration extension scale factor and a current value reduction scale factor (table or functions) is recorded in a memory (not illustrated) in advance. The lighting duration extension scale factor is a scale factor to extend the lighting duration so that the lighting duration becomes 84 or longer. The current value reduction scale factor is a scale factor to reduce the current value when the light source is lit with a lighting duration based on the corresponding lighting duration extension scale factor. In concrete terms, the backlight 100 holds a table as shown in FIG. 28. FIG. 28 is an example of a table representing the lighting duration extension scale factor and the current value reduction scale factor according to this embodiment. In the example in FIG. 28, the lighting duration extension scale factor is 20 and the current value reduction scale factor is 1/20 when the light source temperature is 41 to 44° C., the lighting duration extension scale factor is 5 and the current value reduction scale factor is 1/5 when the light source temperature is 44 to 48° C., the lighting duration extension scale factor is 2 and the current value reduction scale factor is 1/2 when the light source temperature is 48 to 52° C., and the lighting duration extension scale factor is 1.5 and the current value reduction scale factor is 1/1.5 when the light source temperature is 52 to 56° C.

Normally the emission brightness of the backlight is adjusted by the lighting duration, and only when the light source temperature is changed from the standard temperature sensor value by a predetermined value or more, the emission brightness of the backlight is adjusted by using the above mentioned current value reduction scale factor to correct the current value.

If it is determined in S470 that the temperature sensor value acquired by the temperature sensor value acquisition unit 430 is a value lower than the standard temperature sensor value by a predetermined value or more (S470: YES), processing advances to S471. If it is determined in S470 that the temperature sensor value acquired by the temperature sensor value acquisition unit 430 is not a value lower than the standard temperature sensor value by a predetermined value or more (S470: NO), processing advances to S473.

In S471 and S472, the backlight control unit 122 corrects the current value and the lighting duration by multiplying the current preset current value and the current lighting duration by the current value reduction scale factor and the lighting duration extension scale factor corresponding to the temperature of the light source being lit, according to the table in FIG. 28 respectively. The lighting duration is extended by the lighting duration adjustment unit 130.

For example, it is assumed that the lighting duration of a specific light source unit is 80. Then the temperature of the light source of which lighting duration is 80 is lower than the temperature of the light source of which lighting duration is 500, hence the emission efficiency is higher. Therefore if correction is performed to decrease the lighting duration based on the light source temperature, the lighting duration after correction naturally becomes shorter than the lighting duration required for the optical sensor 112 to detect light, which is 84. In this case, the problems where the optical sensor value cannot be acquired or where an incorrect optical sensor value is acquired by the decrease in a number of times of acquiring an optical sensor value becomes more obvious.

Therefore according to this embodiment, the lighting duration and the current value are changed according to the table in FIG. 28. In the following description, it is assumed that the specific light source unit is the light source unit 0 and the standard temperature (standard temperature sensor value) is 60° C., as shown in FIG. 26. Further, in the description of this embodiment, it is assumed that the light source temperature (temperature sensor value) when the lighting duration is 500 is 60° C., the light source temperature (temperature sensor value) when the lighting duration is 80 is 50° C., and the above mentioned predetermined value is 4° C. Further, in this embodiment, it is assumed that the emission brightness of the specific light source unit is changed from 200 cd/m$^2$ to 32 cd/m$^2$, and the lighting duration is changed from 500 to 80 according to the input image data. Since the emission brightness 32 cd/m$^2$ after the change is lower than the first predetermined brightness 60 cd/m$^2$, processing advances from S469 to S470. The light source temperature gradually drops from the light source temperature 60° C. when the lighting duration is 500 to the light source temperature 50° C. when the lighting duration is 80. And when time elapses somewhat, the light source temperature becomes the predetermined temperature 56° C. (=60° C. (standard temperature)−4° C. (predetermined value)) or less. Thus according to this embodiment, the condition that the acquired temperature sensor value is lower than the standard temperature sensor value by the predetermined value is satisfied when the temperature sensor value acquired by the temperature sensor acquisition value 430 becomes 56 or less, that is lower than the standard temperature sensor value 60 by the predetermined value 4. In other words, in this embodiment, the condition that the light source temperature is the predetermined temperature (56° C.) or less is satisfied in S470 if the lighting duration is shortened to 80 and the emission brightness is reduced to 32 cd/m$^2$. If the light source temperature becomes the predetermined temperature or less like this, processing advances from S470 to S471. In this embodiment, a case when the light source temperature is 50° C. is described. In this case, the temperature sensor value 50 acquired by the temperature sensor value acquisition unit 430 in S470 satisfies a condition to be lower than the standard temperature sensor value 60 by the predetermined value 4 or more (value of the predetermined temperature 56 or less), the flow advances from S470 to S471.

In S471, the lighting duration is extended according to the table in FIG. 28. In this embodiment, the extension processing to extend the lighting duration to double is executed using the lighting duration extension scale factor 2 corresponding to the case of the light source temperature 50° C. in a table in FIG. 28. In concrete terms, using the lighting duration extension scale factor 2, which corresponds to the case of the light source temperature 50° C. in the table in FIG. 28, the lighting duration is extended to 160 (=80×2), which is the time length required for the optical sensor to detect light or longer.

After S471, processing advances to S472.

In S472, the backlight control unit 122 reduces the value of current to be supplied to the specific light source unit so that an increase in the amount of luminescence caused by the extension of the lighting duration in S471 is suppressed. The current value is reduced by the current value adjustment unit 131. In this embodiment, the current value is reduced such that a value generated by multiplying the lighting duration after extension by the current value after reduction matches with a value generated by multiplying the lighting duration before extension by the current value before reduction. For example, if the lighting duration of a specific light source unit is extended to double the lighting duration in S471, the value of current to be supplied to the specific light source unit is multiplied by 0.5 (=1/2). As a result, if the current value before reduction (preset current value) of the specific light source unit is 500, the current value after reduction becomes 250 (=500×1/2).

Figure 30:
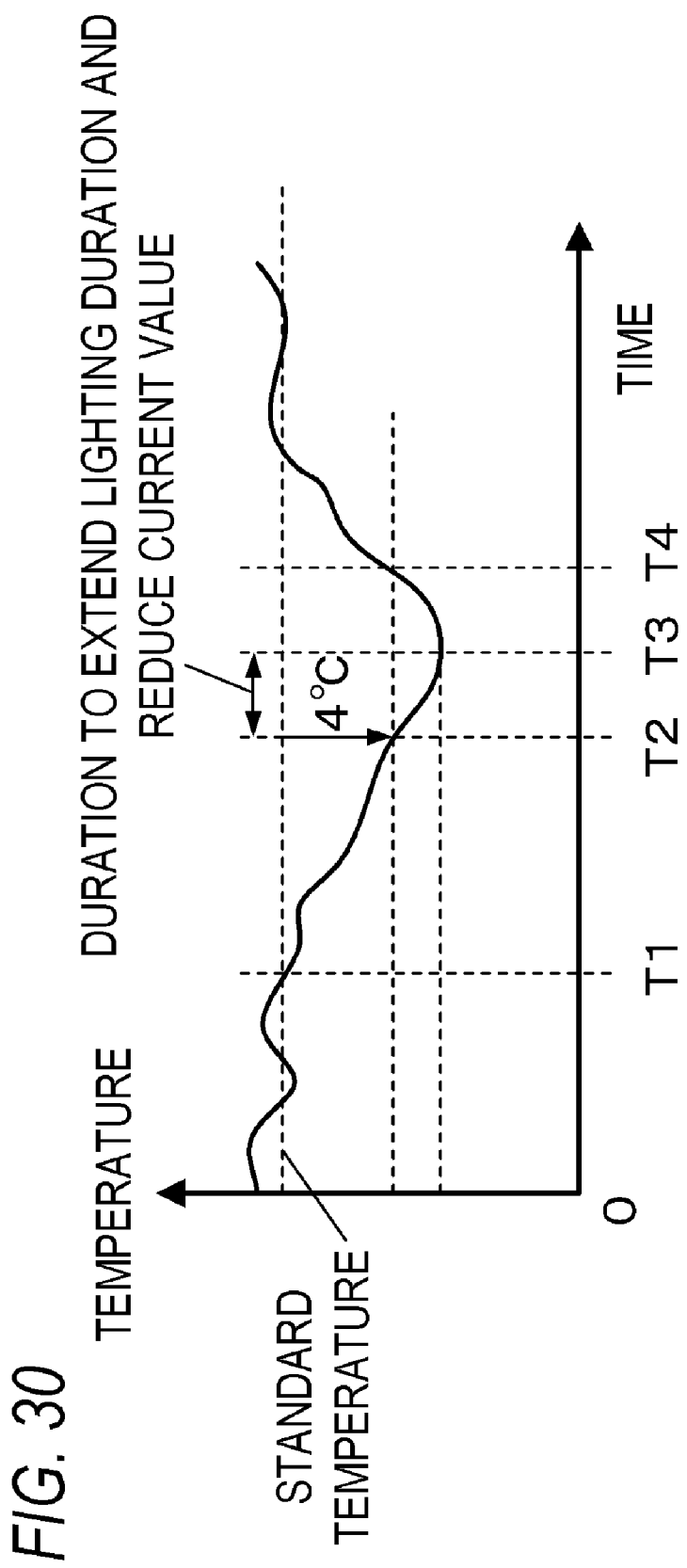
FIG. 30 shows an example of temperature transition when the lighting duration is changed according to Embodiment 4.

If the emission brightness of the specific light source unit is lower than a first predetermined brightness and a temperature sensor value acquired by the temperature sensor value acquisition unit 430 is lower than the standard temperature sensor value by a predetermined value or more, the lighting duration and the current value are corrected, and the reason for this will now be described with reference to FIG. 30. FIG. 30 is a diagram depicting a temperature transition when the lighting duration changed from 500 to 80, and shows a case when the lighting duration changes as 500 at time 0, 80 at time T1, and 500 at time T3. In this case, the temperature is close to the standard temperature at time 0 to T1, and gradually decreases from time T1. The temperature becomes lower than the standard temperature by 4° C. at time T2, and reaches the lowest temperature at time T3.

According to this embodiment, if the emission brightness of a specific light source unit is lower than the first predetermined brightness, the lighting duration of the specific light source unit becomes shorter than the time length required for the optical sensor to detect light. As a result, an optical sensor value may not be acquired or an incorrect optical sensor value may be acquired by the decrease in a number of times of acquiring an optical sensor value. Therefore a control to reduce the current value and extend the lighting duration (control to correct the current value and the lighting duration) is required. In concrete terms, the lighting duration of the specific light source unit is changed from 500 to 80, and the emission efficiency of the light source gradually increases as the light source temperature gradually decreases as in the duration of time T1 to T2. According to this embodiment, responding to the increase of the emission efficiency of the light source, the lighting duration is further decreased from 80. However, if the lighting duration is gradually decreased, the accuracy of the optical sensor value to be acquired drops as time elapses. If it is assumed that the current value is reduced and lighting duration is extended at the timing when the lighting duration is changed from 500 to 80, in order to increase the accuracy of the optical sensor value to be acquired, then the color of the emitted light from the light source changes from the timing when the current value is reduced as the current value decreases. As a result, the color of the display image also changes. Therefore in this embodiment, in order to minimize the change of the colors of the display image (drop in image quality), priority is assigned to suppressing the change of colors of the display image in the time T1 to T2, even if the accuracy of the acquired optical sensor value drops somewhat. Based on this concept, acquisition of the optical sensor value is executed with gradually decreasing lighting duration, without performing control to correct the current value and the lighting duration. Therefore even if the determination in S469 is YES, processing operations in S471 and S472 are not performed, and processing advances to S473 if the determination in S470 is NO. However the accuracy of the optical sensor value to be acquired gradually drops, and accuracy of the feedback control also drops. Hence according to this embodiment, if the temperature of the light source drops to a temperature to reach a predetermined emission efficiency, control to correct the current value and the lighting duration is executed and an optical sensor value is acquired in order to secure accuracy of the feedback control to some extent, thus the accuracy of the optical sensor value to be acquired is increased. In other words, according to this embodiment, when the light source temperature drops to a temperature lower than the standard temperature by a predetermined value (4° C.), the control to correct the current value and the lighting duration is performed and the optical sensor value is acquired, so that the accuracy of the optical sensor value to be acquired is increased.

After S472, processing advances to S473.

Figure 29:
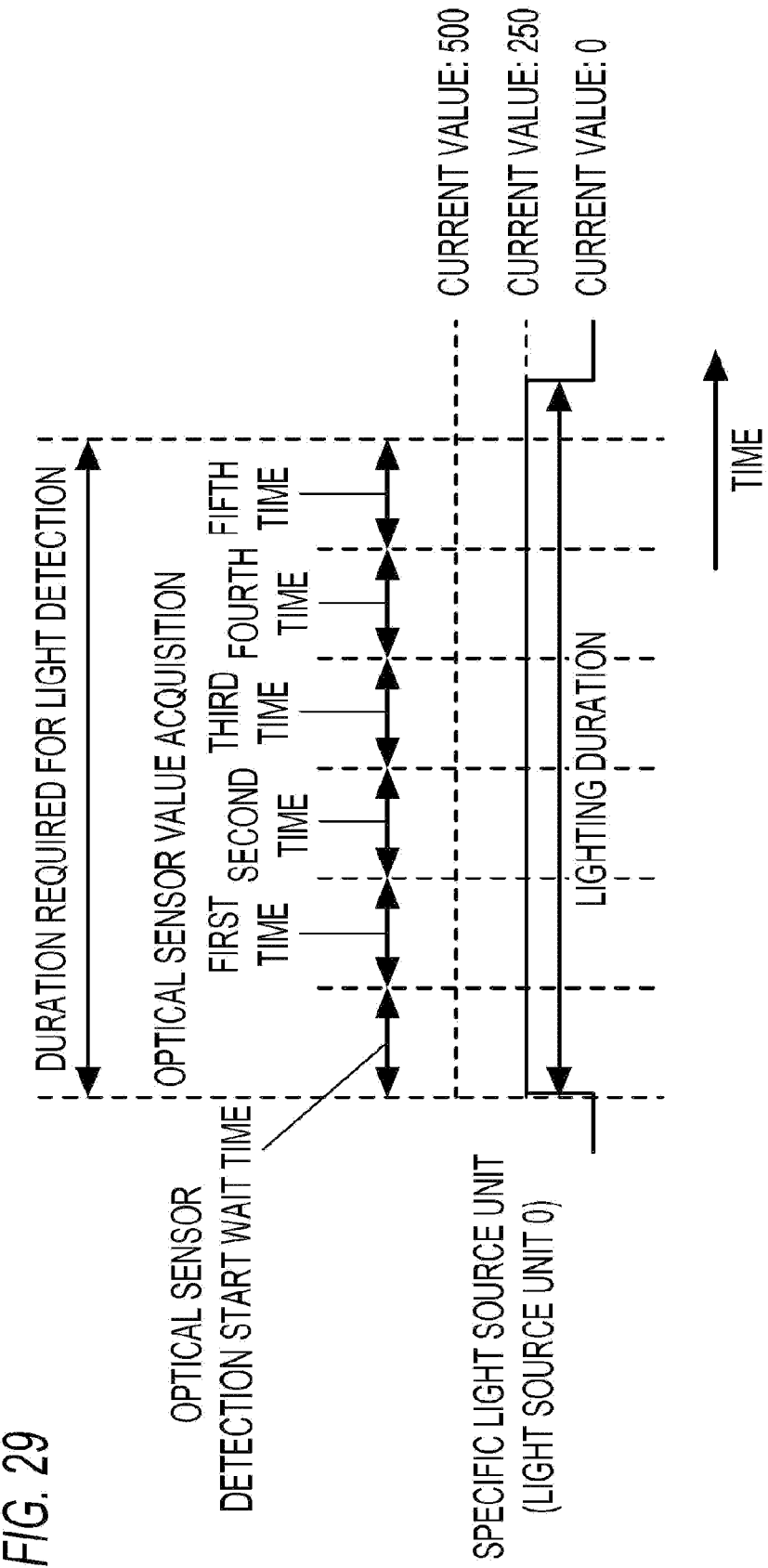
FIG. 29 shows an example of lighting control of a light source unit during the optical sensor value detection according to Embodiment 4.

In S473, the backlight control unit 122 instructs the backlight driving unit 125 to generate a duration during when only a specific light source unit is lit. In concrete terms, if the determination in S470 is YES, it is instructed to generate a duration during when only the specific light source unit is lit with the lighting duration after extension and the current value after reduction (lighting duration determined in S471 and the current value determined in S472). The backlight driving unit 125 generates a duration during when only the specific light source unit emits light responding to the instruction from the backlight control unit 122, and notifies the backlight control unit 122 that the duration during when only the specific light source unit emits light is generated. FIG. 29 shows an example of the lighting duration and the current value in this case. FIG. 29 is an example when the determination in S470 is YES, and an example when the lighting duration before extension and the current value before reduction are values shown in FIG. 9, just like Embodiment 1.

If the determination in S470 is NO, on the other hand, in S473 it is instructed to generate a duration during when only the specific light source unit is lit with the preset lighting duration and the preset current value, as mentioned above. Then the backlight driving unit 125 generates a duration during when only the specific light source unit emits light responding to the instruction from the backlight control unit 122, and notifies the backlight control unit 122 that the duration during when only the specific light source unit emits light is generated.

When the backlight control unit 122 is notified by the backlight driving unit 125 that the duration during when only the specific light source unit is lit is generated in S473, processing advances to S474. In S474, the backlight control unit 122 instructs the optical sensor value acquisition unit 121 to acquire the optical sensor value of the specific light source unit, and instructs the temperature sensor value acquisition unit 430 to acquire the temperature sensor value of the specific light source unit. The optical sensor value acquisition unit 121 acquires the optical sensor value from the optical sensor 112 installed in the specific light source unit, and the temperature sensor value acquisition unit 430 acquires the temperature sensor value from the temperature sensor 432 installed in the specific light source unit. As mentioned above, the optical sensor value is acquired for a plurality of times, and a representative value of the plurality of acquired optical sensor values is acquired as the final optical sensor value.

As mentioned above, according to this embodiment, if a temperature difference not less than a predetermined value is generated between the standard temperature, which corresponds to the preset maximum brightness and is set in the adjustment step during production, and the temperature sensor value (light source temperature) during lighting, the lighting duration is extended and the current value is reduced. Therefore even if the emission efficiency of the light source increases due to the change of the light source temperature and the requirement to shorten the lighting duration of the light source is generated, the single lighting duration of the specific light source unit is adjusted to be longer than the time length required for the optical sensor to detect light.

In S474, if the light source temperature during lighting is lower than the standard temperature, which corresponds to the preset maximum brightness and is set in the adjustment step during production, by a predetermined value or more, a detection result (optical sensor value) is acquired in a state where the lighting duration is extended and the current value is reduced. On the other hand, if the temperature sensor value (light source temperature) is not lower than the standard temperature, which corresponds to the preset maximum brightness, by the predetermined value or more, then a detection result (optical sensor value) in a state where the light source unit is lit with the preset lighting duration and the preset current value is acquired.

Then in S475, the backlight control unit 122 acquires the target optical sensor value of the specific light source unit from the target optical sensor value storage unit 123.

By the processing in S476 and later, the amount of luminescence of each light source unit is controlled based on the optical sensor value acquired in S474. In concrete terms, if the determination in S470 is YES, the amount of luminescence of the light source unit is controlled based on the detection result (optical sensor value) in the state where the lighting duration is extended and the current value is reduced. If the determination in S470 is NO, the amount of luminescence of the light source unit is controlled based on the detection result (optical sensor value) in the state where the light source unit is lit with the preset lighting duration and the preset current value.

In concrete terms, if the current value is reduced in S472, the backlight control unit 122 adjusts the target optical sensor value according to the current value after reduction in S476. If the current value changes, the emission brightness (instantaneous value) changes accordingly. Considering such a change of the emission brightness, the target optical sensor value matching the emission brightness after the change is calculated in this processing. For example, the target optical sensor value of the light source unit 0, when the current value of the light source unit 0 (specific light source unit) is 500, is 500 as shown in FIG. 26. According to this embodiment the target optical sensor value is reduced to 250 (=(250/500)×500) to match the current value of the light source unit 0 after reduction, which is 250.

In S476, the backlight control unit 122 calculates a correction value for the preset lighting duration (hereafter "lighting duration correction value") from the optical sensor value which the backlight control unit 122 acquires in S474 and the target optical sensor value. If the current value is reduced in S472, then the target optical sensor value after the adjustment is used.

The lighting duration correction value is a correction coefficient by which the preset lighting duration is multiplied to correct the change of the amount of luminescence. For example, if the optical sensor value acquired when only the light source unit 0 (specific light source unit) is lit is 300, then the lighting duration correction value is 0.83 (=250/300), since the target optical sensor value of the light source unit 0 is 250.

Then in S477, the backlight control unit 122 determines whether the lighting duration correction value is calculated for all the light source units. If the lighting duration correction value is calculated for all the light source units, processing advances to S478. If there is a light source unit of which the lighting duration correction value is not calculated, the light source unit of which the lighting duration correction value is not calculated is set as the specific light source unit. Then processing returns to S469.

In S478, the backlight control unit 122 calculates the lighting duration after correction for each light source unit. The lighting duration after correction is calculated by multiplying the preset lighting duration before correction by the lighting duration correction value. In concrete terms, if the preset lighting duration before correction of the light source unit 0 is 160 and the lighting duration correction value is 0.83, then the lighting duration after correction is 133 (=160×0.83).

Now a timing of executing the optical sensor value acquisition control according to the present invention, in the case when the lighting duration changes from 500 to 80, will be described with reference to FIG. 30. As mentioned above, the diagram in FIG. 30 depicts a case when the lighting duration changes as 500 at time 0, 80 at time T1 and 500 at time T3. In this case, the temperature is close to the standard temperature at time to T1, and gradually decreases from time T1. The temperature becomes lower than the standard temperature by 4° C. at time T2, and reaches the lowest at time T3 where the lighting duration is 80. Then the temperature gradually increases from time T3, and when time T4 is passed, the temperature difference from the standard temperature becomes 4° C. or less. In this case, the time T2 to T3 becomes a duration during when the temperature difference from the standard temperature is 4° C. or more, and in this duration, the processing to extend the lighting duration and reduce the current value is performed. The time T3 to T4 is also a duration during when the temperature difference from the standard temperature is 4° C. or more, but it is unnecessary to perform the processing to extend the lighting duration and reduce the current value since the lighting duration is 500, and it is sufficient if the optical sensor value is detected in a state where the light source unit is lit with the preset lighting duration and the preset current value.

If the backlight 100 is used with setting the maximum brightness to low, it is experimentally known that the brightness change (brightness unevenness) caused by the temperature change of the light source is negligible since influence on the user is minimal. Therefore when the maximum brightness of the backlight 100 that is set for operation is low, the sensor value need not be constantly acquired. In other words, if the maximum brightness of the backlight 100 that is used for operation is the second predetermined brightness or less (e.g. 50 cd/m$^2$ or less), then the acquisition of the sensor value may be stopped without following the above mentioned processing. In other words, the control of this embodiment (processing to extend the lighting duration considering the light source temperature) may be performed only when the maximum brightness of the backlight 100 that is set for operation is higher than the second predetermined brightness. The acquisition of the sensor value may be continued when the maximum brightness of the backlight 100 is the second predetermined brightness or less, and the lighting duration of the specific light source unit is shorter than a predetermined time length. And the sensor value of the predetermined light source unit acquired in this case may not be used for the feedback control for this specific light source unit.

Furthermore, the amount of luminescence may be corrected by correcting the preset current value, instead of the preset lighting duration, or the amount of luminescence may be corrected by correcting both the preset lighting duration and the preset current value.

As described above, according to this embodiment, even if the preset lighting duration is short and the optical sensor value cannot be acquired normally, a highly accurate optical sensor value can be acquired by changing the lighting duration and the current value, as shown in FIG. 31. Therefore the amount of luminescence of each light source unit can be controlled (corrected) at high precision, and the amount of luminescence of the entire backlight can be maintained at a constant level.

Further, the current value is changed only when a temperature change not less than a predetermined value occurs, hence the generation of the brightness unevenness and the color unevenness caused by the change of the current value can be suppressed.

In this embodiment, the user sets the maximum brightness of the backlight 100 for operation, but the present invention is not limited to this. For example, a control unit (not illustrated) included in the image display apparatus may automatically set the maximum brightness of the backlight 100 based on the category of the image displayed on the image display apparatus. The image display apparatus may further include a natural light sensor, and the control unit included in the image display apparatus may automatically set the maximum brightness of the backlight 100 according to the brightness of the natural light (environmental light) during operation.

Although preferred embodiments of the present invention have been described with reference to the drawings, the present invention is not limited to these examples. In Embodiments 1 to 4, examples of decreasing the current value as the lighting duration of the light source is extended were described, but the display brightness may be adjusted by reducing the transmittance of the display panel as the lighting duration of the light source is extended.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225316, filed on Oct. 10, 2012, and Japanese Patent Application No. 2013-152555, filed on Jul. 23, 2013, which are hereby incorporated by reference herein in their entirety.

What is claimed is:

1. An image display apparatus comprising:
a light emitting unit configured to include a light source;
a display unit configured to display an image on a screen by transmitting light irradiated from the light emitting unit;
a detection unit configured to detect light from the light source;
a determination unit configured to determine whether or not a lighting duration of the light source in a detection period in which the detection unit detects light is shorter than a predetermined time length; and
a control unit configured to extend the lighting duration of the light source in the detection period and to reduce emission brightness of the light source in the detection period, in a case where the determination unit determines that the lighting duration of the light source in the detection period is shorter than the predetermined time length.

2. The image display apparatus according to claim 1, wherein the control unit extends the lighting duration of the light source to be the predetermined time length or longer.

3. The image display apparatus according to claim 1, wherein the control unit reduces a value of current applied to the light source.

4. The image display apparatus according to claim 3, wherein the control unit reduces the value of current so that a value obtained by multiplying the lighting duration before the extension by the value of current before the reduction matches with the value obtained by multiplying the lighting duration after the extension by the value of current after the reduction.

5. The image display apparatus according to claim 3, wherein the control unit corrects the value of current after the reduction.

6. The image display apparatus according to claim 1, wherein the control unit reduces transmittance of the display unit.

7. The image display apparatus according to claim 1, wherein the predetermined time length is a time length required for the detection unit to detect light.

8. The image display apparatus according to claim 1, wherein only in the detection period, the control unit executes the extension of the lighting duration of the light source and the reduction of the emission brightness of the light source.

9. The image display apparatus according to claim 1, wherein the light emitting unit includes a plurality of light sources,
wherein the detection unit detects light from a target light source included in the plurality of light sources, and
wherein the control unit extends a lighting duration of the target light source, reduces emission brightness of the target light source, does not extend a lighting duration of a non-target light source which is a light source other than the target light source, and does not reduce emission brightness of the non-target light source.

10. An image display apparatus comprising:
a light emitting unit configured to include a light source;
a display unit configured to display an image on a screen by transmitting light irradiated from the light emitting unit;
a first detection unit configured to detect light from the light source;
a determination unit configured to determine whether or not emission brightness of the light source in a detection period in which the first detection unit detects light is lower than a first predetermined brightness; and
a control unit configured to extend a lighting duration of the light source in the detection period and to reduce the emission brightness of the light source in the detection period, in a case where the determination unit determines that the emission brightness of the light source in the detection period is lower than the first predetermined brightness.

11. The image display apparatus according to claim 10, further comprising a second detection unit configured to detect a temperature of the light source,
wherein the control unit does not extend the lighting duration of the light source in a case where the temperature detected by the second detection unit is higher than a predetermined temperature.

12. The image display apparatus according to claim 10, wherein the control unit does not extend the lighting duration of the light source in a case where a preset maximum brightness of the light emitting unit is a second predetermined brightness or less.

13. A control method of an image display apparatus including a light emitting unit configured to include a light source and a display unit configured to display an image on a screen by transmitting light irradiated from the light emitting unit, the control method comprising:
detecting light from the light source;
determining whether or not a lighting duration of the light source in a detection period in which light is detected is shorter than a predetermined time length; and
extending the lighting duration of the light source in the detection period and reducing emission brightness of the light source in the detection period, in a case where it is determined that the lighting duration of the light source in the detection period is shorter than the predetermined time length.

14. The control method of the image display apparatus according to claim 13, wherein the lighting duration of the light source is extended to be the predetermined time length or longer.

15. The control method of the image display apparatus according to claim 13, wherein a value of current applied to the light source is reduced when the lighting duration of the light source is extended.

16. The control method of the image display apparatus according to claim 15, wherein the value of current is reduced so that a value obtained by multiplying the lighting duration before the extension by the value of current before the reduction matches with the value obtained by multiplying the lighting duration after the extension by the value of current after the reduction.

17. The control method of the image display apparatus according to claim 15, wherein the value of current after the reduction is corrected when the lighting duration of the light source is extended and the emission brightness of the light source is reduced.

18. The control method of the image display apparatus according to claim 13, wherein transmittance of the display unit is reduced when the lighting duration of the light source is extended and the emission brightness of the light source is reduced.

19. The control method of the image display apparatus according to claim 13, wherein the predetermined time length is a time length required for the detection of light.

20. The control method of the image display apparatus according to claim 13, wherein the extension of the lighting duration of the light source and the reduction of the emission brightness of the light source are executed only in the detection period.

21. The control method of the image display apparatus according to claim 13, wherein the light emitting unit includes a plurality of light sources,
    wherein detecting the light includes detecting light from a target light source included in the plurality of light sources, and
    wherein extending the lighting duration includes:
        extending a lighting duration of the target light source without extending a lighting duration of a non-target light source which is a light source other than the target light source; and
        reducing emission brightness of the target light source without reducing emission brightness of the non-target light source.

* * * * *